United States Patent
Quenzi et al.

(10) Patent No.: US 7,134,829 B2
(45) Date of Patent: Nov. 14, 2006

(54) CARGO TRAILER

(75) Inventors: Philip J Quenzi, Atlantic Mine, MI (US); Richard W Jenney, Naples, FL (US)

(73) Assignee: Absolute Electronic Solutions, Inc., Las Vegas, NV (US)

( * ) Notice: Subject to any disclaimer, the term of this patent is extended or adjusted under 35 U.S.C. 154(b) by 79 days.

(21) Appl. No.: 10/796,619

(22) Filed: Mar. 9, 2004

(65) Prior Publication Data
US 2005/0226707 A1    Oct. 13, 2005

(51) Int. Cl.
*B60P 1/16*    (2006.01)
*B60P 1/28*    (2006.01)

(52) U.S. Cl. .............. 414/482; 180/24.01; 180/41; 414/480; 414/477

(58) Field of Classification Search ........... 414/12, 414/349, 352, 482, 484, 538, 477–480; 180/24, 180/41; 254/96
See application file for complete search history.

(56) References Cited

U.S. PATENT DOCUMENTS

| | | |
|---|---|---|
| 103,102 A | 5/1870 | Stuntz |
| 1,247,034 A | 11/1917 | Thompson |
| 1,336,131 A | 4/1920 | Christie |
| 1,376,649 A | 5/1921 | Schneider |
| 1,395,020 A | 10/1921 | Turnbull et al. |
| 1,443,619 A | 1/1923 | De Virel et al. |
| 1,443,963 A | 2/1923 | Monsen |
| 1,503,710 A | 8/1924 | Rice |
| 1,611,012 A | 12/1926 | Flowers |
| 1,638,009 A | 8/1927 | Cambessedes |
| 1,909,342 A | 5/1933 | Galanot |
| 1,937,062 A | 11/1933 | Kellett ................. 254/2 |
| 2,029,995 A | 2/1936 | Flowers ............... 298/18 |
| 2,032,840 A | 3/1936 | Flowers ............... 298/18 |
| 2,059,212 A | 11/1936 | Dorst ................... 305/3 |
| 2,189,052 A | 2/1940 | Anthony ............... 214/65 |
| 2,190,869 A | 2/1940 | Frentzel, Jr. et al. ...... 298/22 |
| 2,379,094 A | 6/1945 | Maxon, Jr. ............ 214/38 |
| 2,426,342 A | 8/1947 | Couse ................ 180/9.1 |
| 2,613,827 A | 10/1952 | Van Doorne ........ 214/83.12 |
| 2,653,032 A | 9/1953 | Ellis ................... 280/33.5 |
| 2,712,856 A * | 7/1955 | Macphee ............. 180/15 |
| 2,739,837 A | 3/1956 | Sykes ................. 298/22 |
| 2,741,383 A * | 4/1956 | Leckert ............... 414/484 |

(Continued)

FOREIGN PATENT DOCUMENTS

JP    06032168 A  *  2/1994

(Continued)

*Primary Examiner*—Eileen D. Lillis
*Assistant Examiner*—Charles N. Greenhut
(74) *Attorney, Agent, or Firm*—Van Dyke, Gardner, Linn & Burkhart, LLP

(57) ABSTRACT

A trailer for carrying cargo includes a frame, at least two axles mounted to the frame, and a deck. The axles have wheels at opposite ends of the axles for movably supporting the frame above the ground. The deck is pivotally mounted to the frame and is pivotable about a first axis relative to the frame and a second axis relative to the frame via at least two supports. The first axis extends generally longitudinally along the deck and the second axis extends generally laterally across the deck and generally normal to the first axis. The deck is also slidable generally along the first axis relative to the frame and/or one of the supports. The deck thus may be adjusted about multiple axes and may be moved forwardly or rearwardly relative to the frame to position the deck in a desired location and orientation relative to the frame.

41 Claims, 28 Drawing Sheets

U.S. PATENT DOCUMENTS

| | | | | |
|---|---|---|---|---|
| 2,786,590 A | | 3/1957 | Edwards et al. | 214/506 |
| 2,818,275 A | | 12/1957 | Hollowell | 280/443 |
| 2,849,129 A | | 8/1958 | Likens | 214/38 |
| 2,949,992 A | | 8/1960 | Weinberg | 193/35 |
| 2,999,721 A | * | 9/1961 | Wood | 298/17 S |
| 3,093,388 A | | 6/1963 | Kulyk | 280/81 |
| 3,096,995 A | * | 7/1963 | Richnow, Jr. | 280/682 |
| 3,105,704 A | | 10/1963 | Schramm | 280/443 |
| 3,120,408 A | | 2/1964 | Pruss | 298/8 |
| 3,138,276 A | * | 6/1964 | Allen et al. | 414/491 |
| 3,159,294 A | * | 12/1964 | Forsythe, Jr. | 414/478 |
| 3,210,120 A | | 10/1965 | Gouin | 298/22 |
| 3,272,546 A | * | 9/1966 | Cooley | 294/2 |
| 3,305,110 A | | 2/1967 | Tantlinger | 214/38 |
| 3,314,690 A | * | 4/1967 | Bunchak | 180/24 |
| 3,319,932 A | * | 5/1967 | Szczepanik | 254/9 C |
| 3,328,019 A | * | 6/1967 | Wilson | 267/186 |
| 3,376,989 A | | 4/1968 | Hilbun | 214/517 |
| 3,430,792 A | * | 3/1969 | Grove et al. | 414/477 |
| 3,439,790 A | | 4/1969 | Langley et al. | 193/35 |
| 3,450,282 A | * | 6/1969 | Ezolt | 414/477 |
| 3,485,400 A | * | 12/1969 | Pewthers | 414/477 |
| 3,506,144 A | | 4/1970 | Carder et al. | 214/38 |
| 3,520,549 A | | 7/1970 | De Lay | 280/81 |
| 3,640,578 A | * | 2/1972 | Finney | 298/17 S |
| 3,666,127 A | | 5/1972 | Guyaux | 214/512 |
| 3,684,108 A | * | 8/1972 | Olson | 414/531 |
| 3,688,926 A | | 9/1972 | Stefanelli | 214/38 BA |
| 3,689,106 A | * | 9/1972 | Young | 410/1 |
| 3,709,450 A | | 1/1973 | Watts et al. | 244/118 |
| 3,734,538 A | * | 5/1973 | Humes | 280/426 |
| 3,743,044 A | * | 7/1973 | Scheele | 180/24 |
| 3,762,487 A | | 10/1973 | Bilas | 180/24.09 |
| 3,874,538 A | | 4/1975 | Kessler et al. | 214/516 |
| 3,893,540 A | * | 7/1975 | Beucher | 182/2.9 |
| 3,934,740 A | * | 1/1976 | Rumell | 414/484 |
| 3,944,096 A | | 3/1976 | Carder | 214/512 |
| 3,987,919 A | | 10/1976 | Weeks et al. | 214/506 |
| 4,015,879 A | * | 4/1977 | Shonkwiler | 298/14 |
| 4,036,528 A | * | 7/1977 | Langendorf | 298/17 S |
| 4,077,532 A | | 3/1978 | Bryan | 214/310 |
| 4,139,236 A | | 2/1979 | Hill et al. | 298/14 |
| 4,203,697 A | | 5/1980 | Cayton | 414/345 |
| 4,249,843 A | | 2/1981 | Kerr | 414/44 |
| 4,312,619 A | | 1/1982 | Anderson et al. | 414/347 |
| 4,348,150 A | | 9/1982 | Inghram et al. | 414/529 |
| 4,352,625 A | * | 10/1982 | Bolderoff | 414/494 |
| 4,373,738 A | | 2/1983 | Lange | 280/81.5 |
| 4,452,496 A | | 6/1984 | van der Lely | 305/35 EB |
| 4,455,118 A | * | 6/1984 | Scharf | 414/494 |
| 4,456,280 A | | 6/1984 | Gevers | 280/444 |
| 4,494,766 A | | 1/1985 | McHugh et al. | 280/444 |
| 4,524,841 A | | 6/1985 | Waggoner | 280/81 A |
| 4,541,768 A | | 9/1985 | Walker et al. | 414/535 |
| 4,568,094 A | | 2/1986 | Lovell | 280/6 R |
| 4,572,527 A | | 2/1986 | Stafford-Mills et al. | 280/6.1 |
| 4,593,810 A | | 6/1986 | Cook | 198/781 |
| 4,638,887 A | * | 1/1987 | Kishi | 187/243 |
| 4,655,667 A | | 4/1987 | Plumb et al. | 414/343 |
| 4,657,099 A | | 4/1987 | Baltensperger | 180/9.28 |
| 4,673,328 A | * | 6/1987 | Shiels | 414/471 |
| 4,690,246 A | * | 9/1987 | Hornagold et al. | 182/2.3 |
| 4,694,930 A | * | 9/1987 | Kishi | 182/2.11 |
| 4,702,662 A | | 10/1987 | Marlett | 414/477 |
| 4,737,063 A | | 4/1988 | van den Pol | 414/346 |
| 4,770,592 A | * | 9/1988 | Winter | 414/477 |
| 4,787,808 A | | 11/1988 | Shimoji et al. | 414/531 |
| 4,806,061 A | * | 2/1989 | Fenton | 414/475 |
| 4,854,409 A | | 8/1989 | Hillebrand et al. | 180/24.02 |
| 4,854,805 A | * | 8/1989 | Althoff et al. | 414/495 |
| 4,995,772 A | | 2/1991 | Biggio | 414/458 |
| 5,011,362 A | | 4/1991 | Pijanowski | 414/480 |
| 5,035,439 A | | 7/1991 | Petrillo | 280/81.6 |
| 5,069,507 A | | 12/1991 | Lindsey | 298/11 |
| 5,110,153 A | * | 5/1992 | Kallansrude et al. | 180/41 |
| 5,113,958 A | | 5/1992 | Holden | 180/9.4 |
| 5,118,241 A | | 6/1992 | Cochran et al. | 414/345 |
| 5,159,989 A | * | 11/1992 | Claxton | 180/41 |
| 5,165,838 A | | 11/1992 | Kallansrude et al. | 414/471 |
| 5,167,295 A | | 12/1992 | Moog | 180/209 |
| 5,184,366 A | | 2/1993 | Rawdon et al. | 14/71.5 |
| 5,188,379 A | | 2/1993 | Krause et al. | 280/6.12 |
| 5,191,951 A | | 3/1993 | Bargfrede et al. | 180/9.1 |
| 5,192,189 A | | 3/1993 | Murata et al. | 414/477 |
| 5,193,063 A | | 3/1993 | Assh | 364/424.05 |
| 5,219,259 A | | 6/1993 | Cochran et al. | 414/345 |
| 5,246,329 A | * | 9/1993 | Farrell | 414/478 |
| 5,246,330 A | * | 9/1993 | Marmur et al. | 414/494 |
| 5,269,641 A | | 12/1993 | Cochran et al. | 414/345 |
| 5,285,205 A | | 2/1994 | White | 340/932.2 |
| 5,328,320 A | | 7/1994 | Farrow et al. | 414/495 |
| 5,372,353 A | * | 12/1994 | West | 254/10 B |
| 5,417,540 A | | 5/1995 | Cox | 414/495 |
| 5,467,827 A | | 11/1995 | McLoughlin | 169/24 |
| 5,505,481 A | | 4/1996 | VanDenberg | 280/704 |
| 5,529,454 A | * | 6/1996 | Alm et al. | 414/478 |
| 5,630,694 A | | 5/1997 | Ihara | 414/495 |
| 5,662,453 A | | 9/1997 | Gerstner et al. | 414/812 |
| 5,769,502 A | * | 6/1998 | Bettini | 298/17 S |
| 5,775,868 A | | 7/1998 | Mann | 414/475 |
| 5,778,798 A | | 7/1998 | VanDenberg | 105/215.2 |
| 5,851,099 A | | 12/1998 | Garcia | 414/398 |
| 5,871,328 A | | 2/1999 | Pinkston | 414/477 |
| 5,971,493 A | * | 10/1999 | Robert | 298/17 S |
| 6,045,316 A | * | 4/2000 | Dole | 414/482 |
| 6,120,052 A | | 9/2000 | Capik et al. | 280/477 |
| 6,171,047 B1 | * | 1/2001 | Vandervalk | 414/24.5 |
| 6,176,505 B1 | | 1/2001 | Capik et al. | 280/477 |
| 6,276,890 B1 | | 8/2001 | Pratt | 414/477 |
| 6,447,044 B1 | | 9/2002 | Buker et al. | 296/99.1 |
| 6,520,736 B1 | | 2/2003 | Pratt | 414/812 |
| 6,547,335 B1 | | 4/2003 | McSweeney | 298/12 |
| 6,783,187 B1 | * | 8/2004 | Parsons | 298/22 R |
| 6,796,572 B1 | * | 9/2004 | McGhie | 280/426 |
| 2002/0036392 A1 | | 3/2002 | Damron | 280/656 |
| 2004/0080206 A1 | * | 4/2004 | Parsons | 298/22 R |

FOREIGN PATENT DOCUMENTS

JP  07332893 A  * 12/1995

* cited by examiner

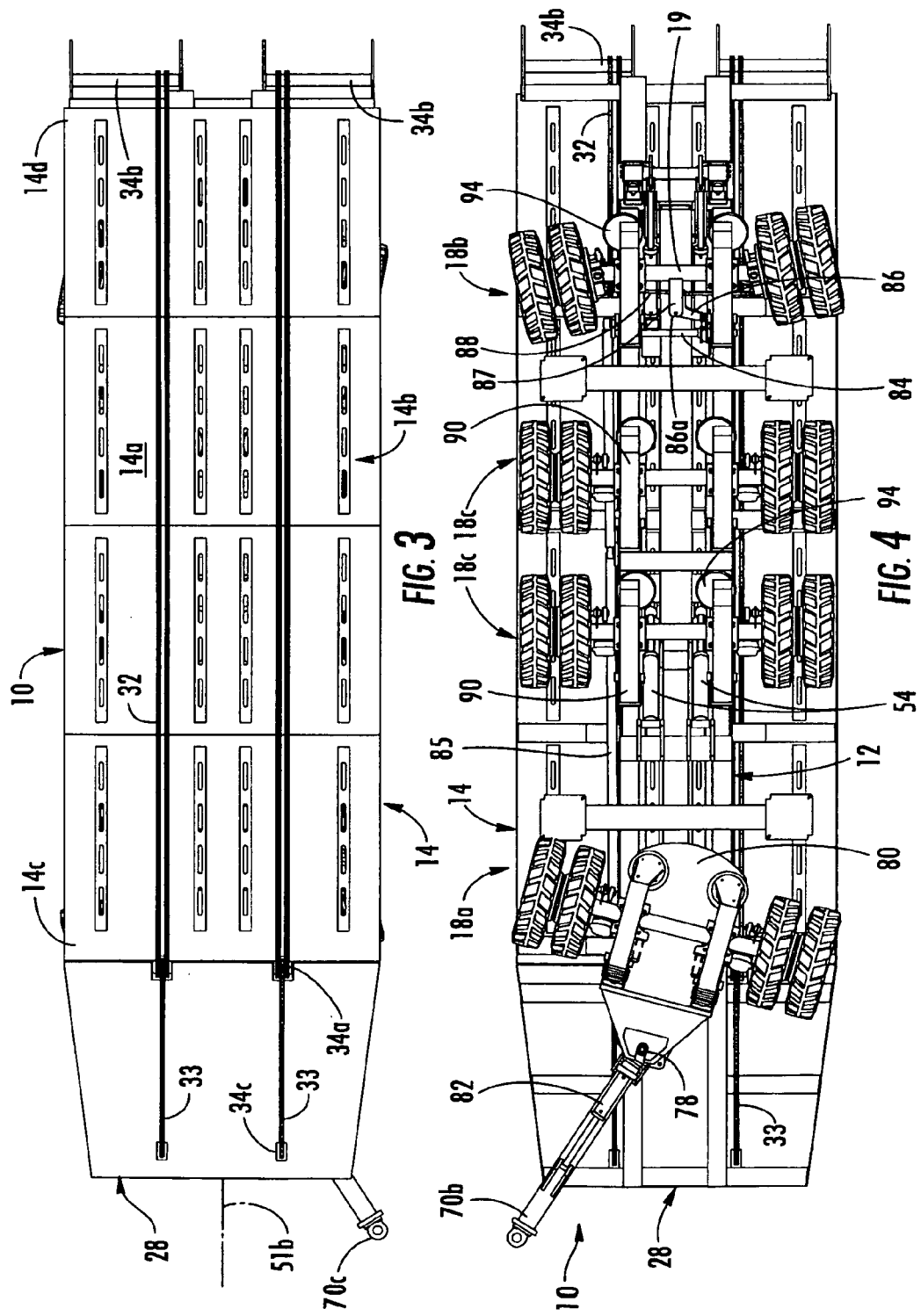

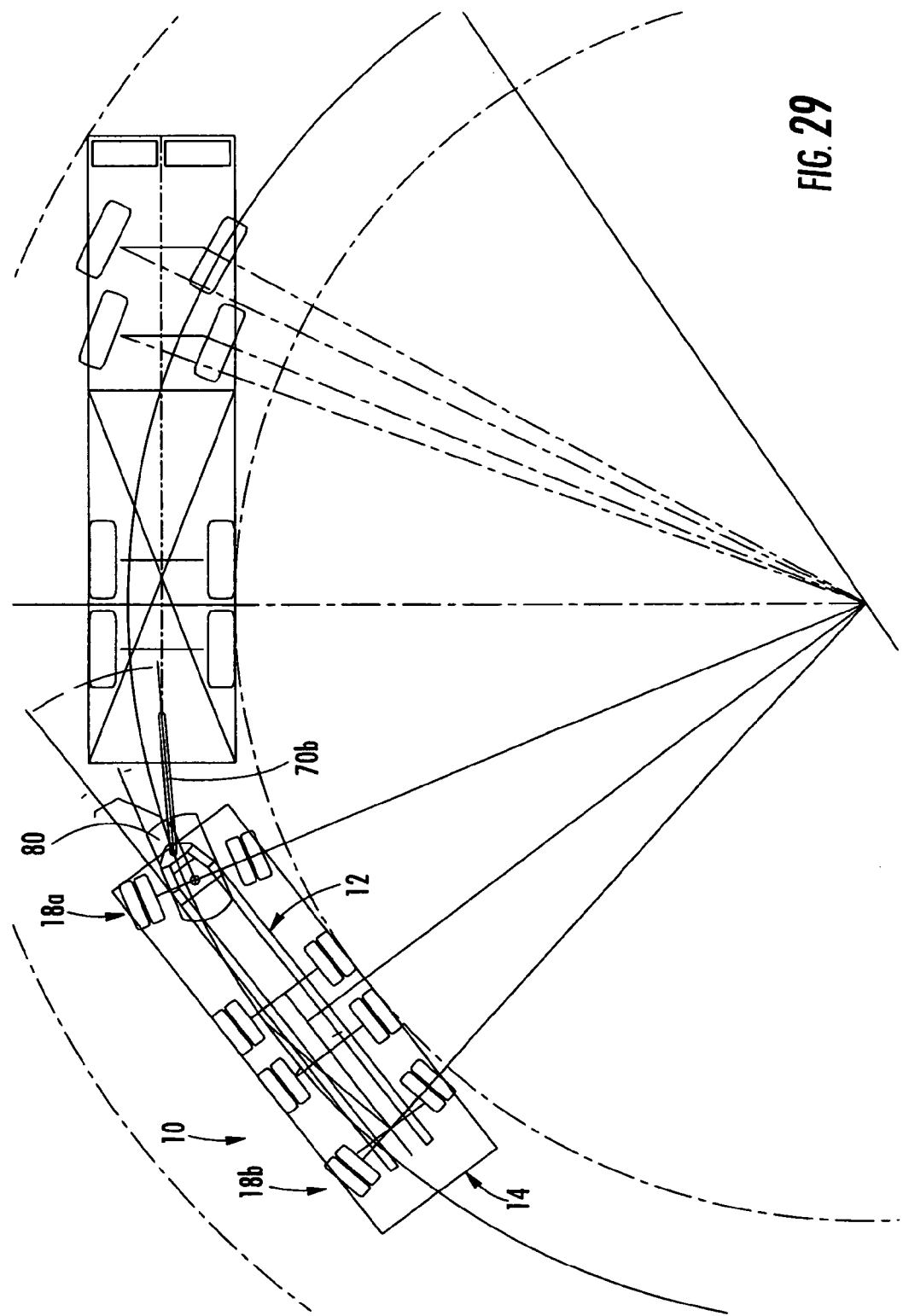

CARGO TRAILER

FIELD OF THE INVENTION

The present invention relates generally to a trailer for carrying cargo and, more particularly, to a trailer that may carry cargo on a deck of the trailer that is adjustable to ease loading and unloading of the cargo from the trailer. The cargo trailer of the present invention is particularly suited for a cargo handling adverse terrain trailer (CHATT) for transporting cargo and loading cargo into a transport aircraft or the like, but may be equally suited for other applications as well.

BACKGROUND OF THE INVENTION

Trailers or vehicles for carrying cargo and for loading cargo into vehicles, such as aircraft and the like, are generally known. Such trailers typically have a platform that may be raised upward to position the platform at a loading portion of the vehicle or aircraft to ease loading of the cargo from the trailer to the aircraft. The trailers may be able to adjust the platform to maintain the platform relatively level at the raised position to support the cargo at the desired level at the vehicle. Typically, such trailers or cargo carriers have the cargo lifted upward from the ground and placed on the platform at the trailer prior to transporting the cargo, and then elevate the platform to the desired height at the targeted vehicle or aircraft. Examples of such trailers or vehicles are shown in U.S. Pat. Nos. 3,666,127; 3,688,926; 3,944,096; 5,165,838; 5,630,694 and 6,447,044. Such trailers or vehicles often include multiple pivotable arms/linkages which pivot relative to one another and to the frame and platform of the trailer in order to provide the desired elevational adjustments to the trailer. Also, although such trailers or vehicles are often capable of transporting and elevating cargo to a desired elevated loading area, such as at an aircraft or the like, the cargo or articles must first be lifted upward onto the trailer platform, which is often cumbersome and difficult to accomplish, and sometimes requires a forklift or the like.

SUMMARY OF THE INVENTION

The present invention provides a trailer or vehicle for carrying cargo that may be readily loaded by moving the cargo onto the platform or deck of the trailer when it is tilted down toward the ground. The platform or deck of the trailer may be selectively raised or lowered or otherwise adjusted to provide a generally level platform or deck during transport of the cargo to the targeted vehicle or aircraft and during unloading of the cargo at an elevated receiving portion of the vehicle or aircraft. The cargo trailer may comprise a cargo handling adverse terrain trailer (CHATT) for loading and unloading cargo containers from military transport aircraft and the like. The deck may be substantially universally adjustable to meet varying terrain conditions that the trailer may encounter.

According to an aspect of the present invention, a trailer for carrying cargo includes a frame portion, at least two axles mounted to a frame portion and a deck. Each of the axles includes at least one wheel at opposite ends of the axle, whereby the wheels and axles support the frame portion above the ground. The deck is pivotally mounted to the frame portion via first and second supports. The supports are independently operable or adjustable to raise and lower respective portions of the deck relative to the frame portion. The deck is pivotable about a first axis relative to the frame portion and about a second axis relative to the frame portion via the supports. The first axis extends generally longitudinally along the deck, while the second axis extends generally laterally across the deck and generally normal to the first axis. The deck is slidable generally along the first axis relative to the frame portion and/or the second support. For example, the deck may slide rearward and may be tilted about the second axis such that a rearward end of the deck may contact the ground.

According to another aspect of the present invention, a trailer for carrying cargo includes a frame portion, at least two axles mounted to the frame portion, and a deck. The axles include wheels at opposite ends of the axles, such that the wheels and axles support the frame portion of the ground. The deck is pivotally mounted to the frame portion by a boom member and at least one rear support. The boom member is pivotally connected to the frame portion and to the forward portion of the deck. The rear support is connected at a rear portion of a frame portion and at a rearward portion of the deck. The boom member is pivotable about a lateral axis extending generally laterally across the frame portion to vertically adjust the forward portion of the deck relative to the frame portion. The boom member pivots about the laterally extending axis via a first actuator attached to the frame portion and the boom member. The boom member extends and retracts to longitudinally adjust a position of the deck relative to the frame portion. The boom member is extendable and retractable via a second actuator positioned along at least a portion of the boom member.

The boom member may be attached to the forward portion of the deck via a multi-axis connection that facilitates pivotal movement of the forward portion of the deck about at least two axes. The deck thus may pivot relative to the boom member and the frame portion about both a longitudinal pivot axis extending generally longitudinally along the deck and the laterally extending pivot axis. The boom member may comprise a telescopic boom member that may extend and retract to longitudinally adjust the position of the deck relative to the frame portion.

According to another aspect of the present invention, a trailer for carrying cargo includes a frame portion, at least two axles mounted to the frame portion and a deck. The axles include wheels at opposite ends of the axles, such that the wheels and axles support the frame portion above the ground. The deck is pivotally mounted to the frame portion and is pivotable about a longitudinal axis relative to the frame portion. The longitudinal axis extends generally longitudinally along the deck, while the lateral axis extends generally laterally across the deck and generally normal to the longitudinal axis. A rearward portion of the deck is attached to a pair of rearward supports, which are attached to a rearward portion of the frame portion at respective and opposite sides of the centerline of the frame portion. The rearward supports are pivotable relative to the frame portion about a laterally extending axis at the frame portion. The rearward supports pivot to vertically adjust the rearward portion of the deck relative to the frame portion. The rearward supports are independently extendable and retractable to pivot the deck about the longitudinal axis.

The deck may be slidably attached to the rearward supports, such that the rearward supports may slide along the deck as the rearward supports are pivoted about the laterally extending axis at the frame portion. The deck may be attached to an extendable and retractable boom member that extends and retracts to slide the deck relative to the rearward supports and the frame portion. The rearward supports may be pivotable about the laterally extending axis of the frame to move the rearward portion of the deck rearwardly relative to the frame portion and to lower the rearward portion of the deck downward toward and into contact with the ground and rearward from the frame portion.

According to another aspect of the present invention, a trailer for carrying cargo includes a frame portion, a deck attached to the frame portion, front and rear axles mounted to the frame portion, and a hitching member for connecting the trailer to a towing vehicle. Each of the axles includes at least one wheel at opposite ends of the axle, such that the wheels and axles support the frame portion above the ground. The front axle comprises a steerable axle and is mounted to an axle base that is pivotally attached to the frame and that is pivotable about a first generally vertical axis to turn the front axle relative to the frame portion to steer the trailer. A hitching member is pivotally attached to a front portion of the frame portion and is pivotable about a second generally vertical axis that is spaced from and forward of the first axis. The hitching member is movably engaged with or connected to the axle base forward of the second axis, such that pivotal movement of the hitching member about the second axis causes pivotal movement of the axle base about the first axis.

The hitching member may be movably engaged with the axle base via a mounting member of the hitching member extending through a slot in the axle base. The mounting member may urge the axle base to pivot and may move along the slot when the hitching member pivots about the second axis and while the axle base pivots about the first axis. The hitching member may be pivotable about the second axis via at least one actuator connected between the hitching member and the frame portion. The hitching member may be vertically adjustable to adjust a hitching end of the hitching member relative to the frame portion.

Optionally, the rear axle assembly may comprise a steerable rear axle assembly that is pivotable about a third generally vertical axis to steer or turn a rear portion of the trailer. The rear wheels or the rear axle may pivot in a second direction in response to the front axle pivoting in a first direction, with the second direction being generally opposite to the first direction. The rear wheels or the rear axle may be connected to the front axle via at least one connecting member or linkage, whereby the connecting member may urge the rear axle or rear wheels to pivot in the second direction when the front axle pivots in the first direction.

Optionally, the cargo trailer may include at least one center axle and wheels positioned between the front and rear axles. The front, rear and center axles may be vertically adjustable relative to the frame portion. The center axle or axles may be selectively raisable relative to the frame portion and relative to the front and rear axles, so that the frame portion is supported substantially or only by the wheels of the front and rear axles. Alternately, the front and rear axles may be selectively raisable relative to the frame portion and the center axle, such that the frame portion is supported substantially or only by the wheels of the center axle or axles.

Therefore, the present invention provides a cargo handling adverse terrain trailer for transporting cargo which may be readily loaded with cargo and which may be readily unloaded at a desired or targeted vehicle, such as an aircraft or the like. The deck of the trailer may be moved rearwardly and tilted downwardly toward the ground to ease loading of the trailer. When the trailer has been positioned at or near the desired unloading area, such as at an elevated loading or receiving portion of an aircraft or the like, the deck may be raised upwardly to position the cargo generally at the level of the loading area to ease unloading of the cargo from the trailer and loading of the cargo into the aircraft. The deck may be tilted or angled to one side or the other relative to the frame of the trailer to facilitate leveling of the deck at the aircraft or the like. The trailer may be steerable to ease maneuverability of the trailer between the loading and unloading areas and may have wheels that are selectively lowered into engagement with the ground to adapt the trailer to different terrains and driving conditions.

These and other objects, advantages, purposes and features of the present invention will become more apparent upon review of the following specification in conjunction with the drawings.

BRIEF DESCRIPTION OF THE DRAWINGS

FIG. 3 is a top plan view of the cargo trailer of FIGS. 1 and 2;

FIG. 4 is a lower plan view of the cargo trailer of FIGS. 1–3;

FIG. 29 is a schematic of the cargo trailer of the present invention, showing the turning radius of the cargo trailer of the present invention.

DESCRIPTION OF THE PREFERRED EMBODIMENTS

Figure 17:
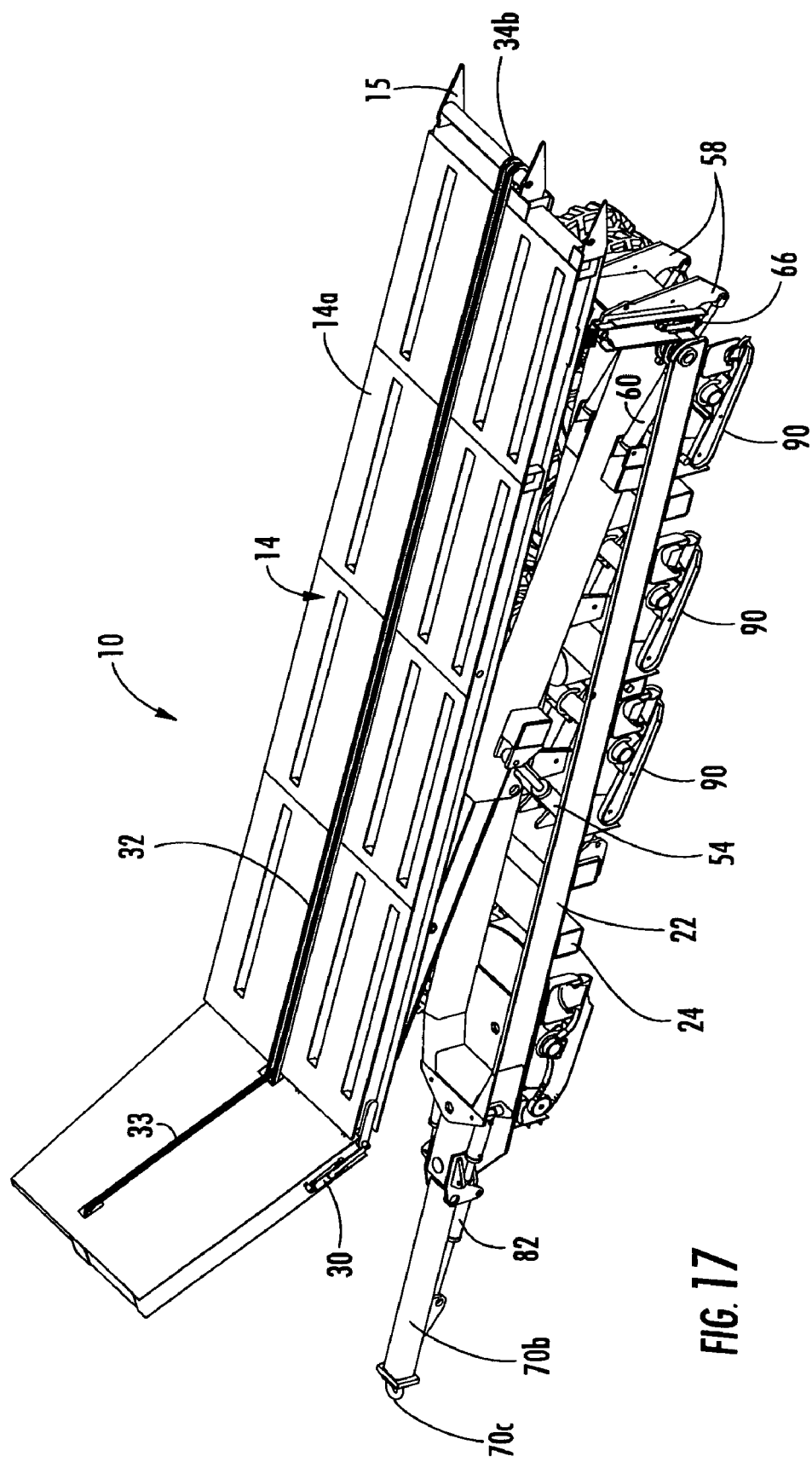
FIG. 17 is a perspective sectional view of the cargo trailer, also taken along the line XV—XV in FIG. 11.
Figure 18:
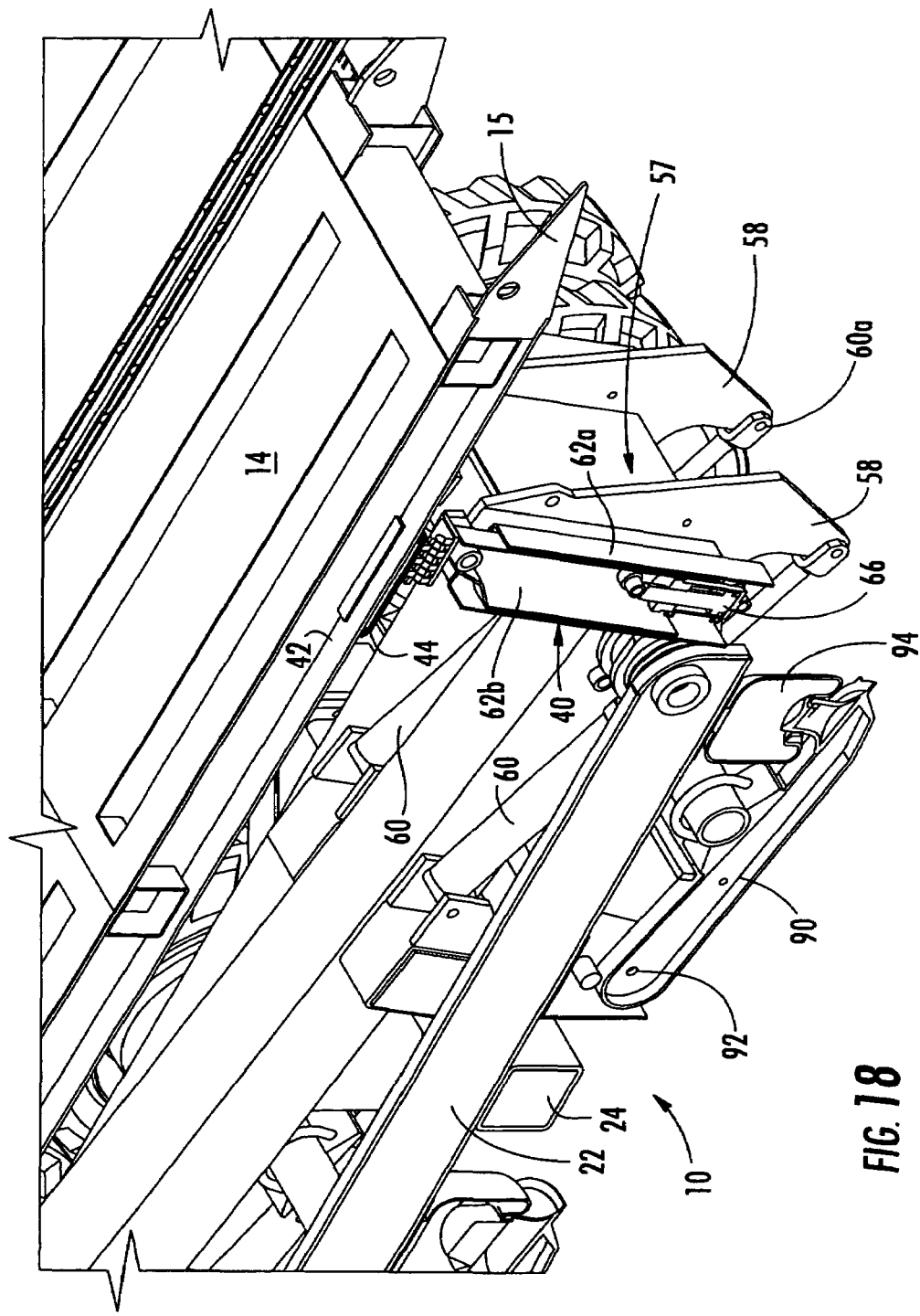
FIG. 18 is an enlarged perspective sectional view of the rear portion of the cargo trailer of FIG. 17.

Referring now to the drawings and the illustrative embodiments depicted therein, a cargo trailer 10 includes a frame or frame portion 12 and a deck or deck portion 14 pivotally and adjustably mounted to frame 12. Frame 12 may be supported above the ground via a plurality of tires 16a on wheels 16b on axles 19 of multiple axle assemblies 18. Cargo trailer 10 may receive or support cargo on deck 14 and may pivot or tilt downwardly to the ground to load the cargo onto the deck 14, such as shown in FIG. 17 and discussed below. Deck 14 may also be raised upwardly above frame 12 (as shown in FIGS. 1–8) to generally align deck 14 with an unloading portion of a targeted vehicle or the like, such as a cargo bay of an aircraft 20 (FIG. 2) or the like, as also discussed below.

The cargo trailer of the present invention and aspects thereof are particularly suited for a cargo handling adverse terrain trailer (CHATT) for loading and unloading cargo containers from military transport aircraft and the like. For example, the trailer may be towed by a vehicle 11 (FIG. 27), such as a military vehicle, such as a heavy expanded mobility tactical truck (HEMTT) or the like, or by other types of towing vehicles, without affecting the scope of the present invention. Although shown and described as a trailer that is towable behind a driven vehicle, it is envisioned that aspects of the present invention are suitable for application to cargo carrying vehicles, such as trucks and the like that have a cargo carrying bed or platform or deck. The term "trailer" as used herein is not intended to be limited only to towable, non-driven trailers, but is intended to cover such vehicles with cargo carrying beds or decks attached thereto.

The deck of the trailer may be universally adjustable relative to the frame to meet varying terrain conditions that the trailer may encounter. The deck is substantially universally adjustable via a three-point connection of the deck to a front lift boom and a pair of rear lifts or supports, as discussed below. The three-point connection includes a multi-axis or substantially universal connection to the forward end of the lift boom and to the pair of lift arms or supports. The rear supports may be pivoted together relative to the frame and may be independently extended and retracted to adjust or tilt the deck toward one side or the other as allowed by the universal connections or joints at the ends of the lift arms and at the end of the boom. Each of the lift arms may be slidably connected to the underside of the deck by means of slide members and rails or tracks, so that as the lift boom is extended or retracted, the deck may slide forwardly or rearwardly on the slide members irrespective of the tilt of the trailer bed. The deck may be adjustable relative to the frame about either of the axes or may be adjusted along its longitudinal axis irrespective of the degree of tilt about either of the axes and of the position of the deck along the longitudinal axis relative to the frame.

Figure 26:
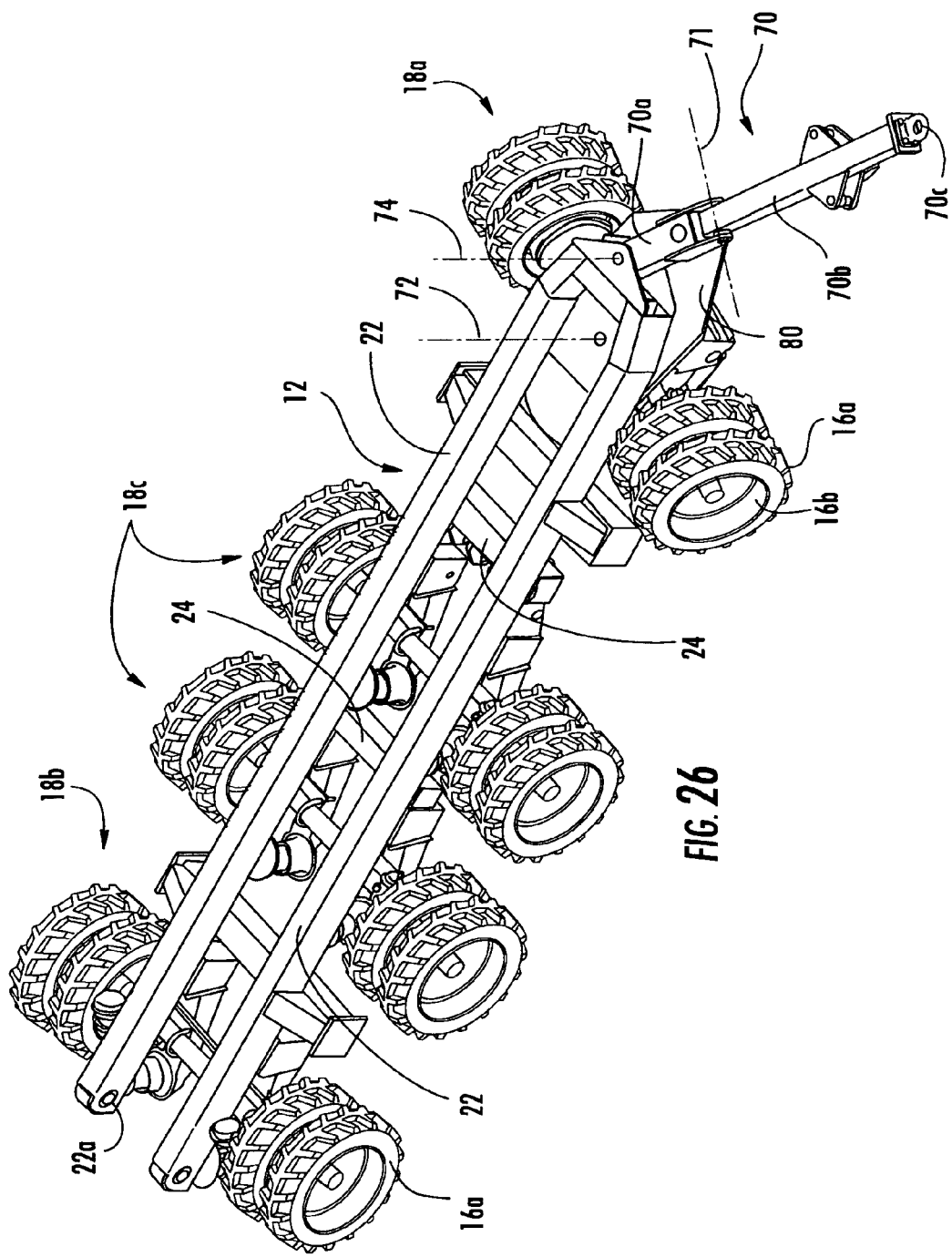
FIG. 26 is a perspective view of the frame and axles and hitching assembly of the cargo trailer of the present invention.

As shown in FIG. 26, frame or frame portion 12 of cargo trailer 10 may include a pair of longitudinal frame members 22 and multiple cross members 24 extending across and between and connecting longitudinal frame members 22 to define a generally rectangular frame portion. Frame 12 may include an extendable stabilizer 26 generally at each of the corners of the trailer to provide support and stability to the trailer when stabilizers 26 are extended or lowered into engagement with the ground. Stabilizers 26 may be extended or lowered via any known means, such as hydraulic cylinders or actuators or the like, without affecting the scope of the present invention.

The axle assemblies 18 may be mounted to the underside of frame 12. Axle assemblies 18 may comprise a front axle assembly 18a, a rear axle assembly 18b and one or more center axle assemblies 18c spaced along frame 12 to provide support of frame 12 and deck 14 above the ground. As discussed below, the front and rear axle assemblies 18a, 18b may be steerable or adjustable to steer the trailer 10. As also discussed below, the axle assemblies 18a, 18b, 18c may optionally be vertically adjustable relative to frame 12 and relative to one another, such that one or more of the axle assemblies may be raised above the ground while the other axle assemblies support the frame above the ground.

Figure 1:
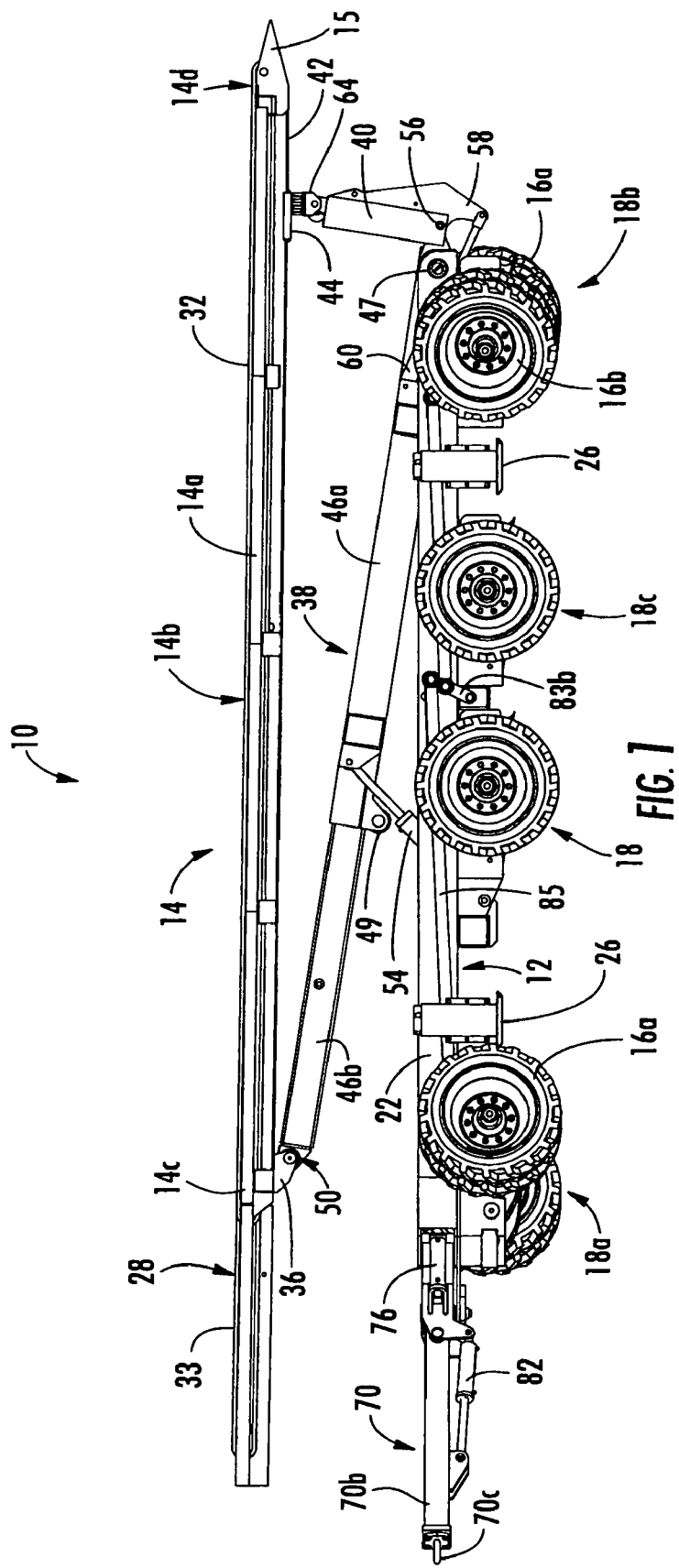
FIG. 1 is a side elevation of a cargo trailer in accordance with the present invention, with a deck of the trailer in an elevated position.
Figure 8:
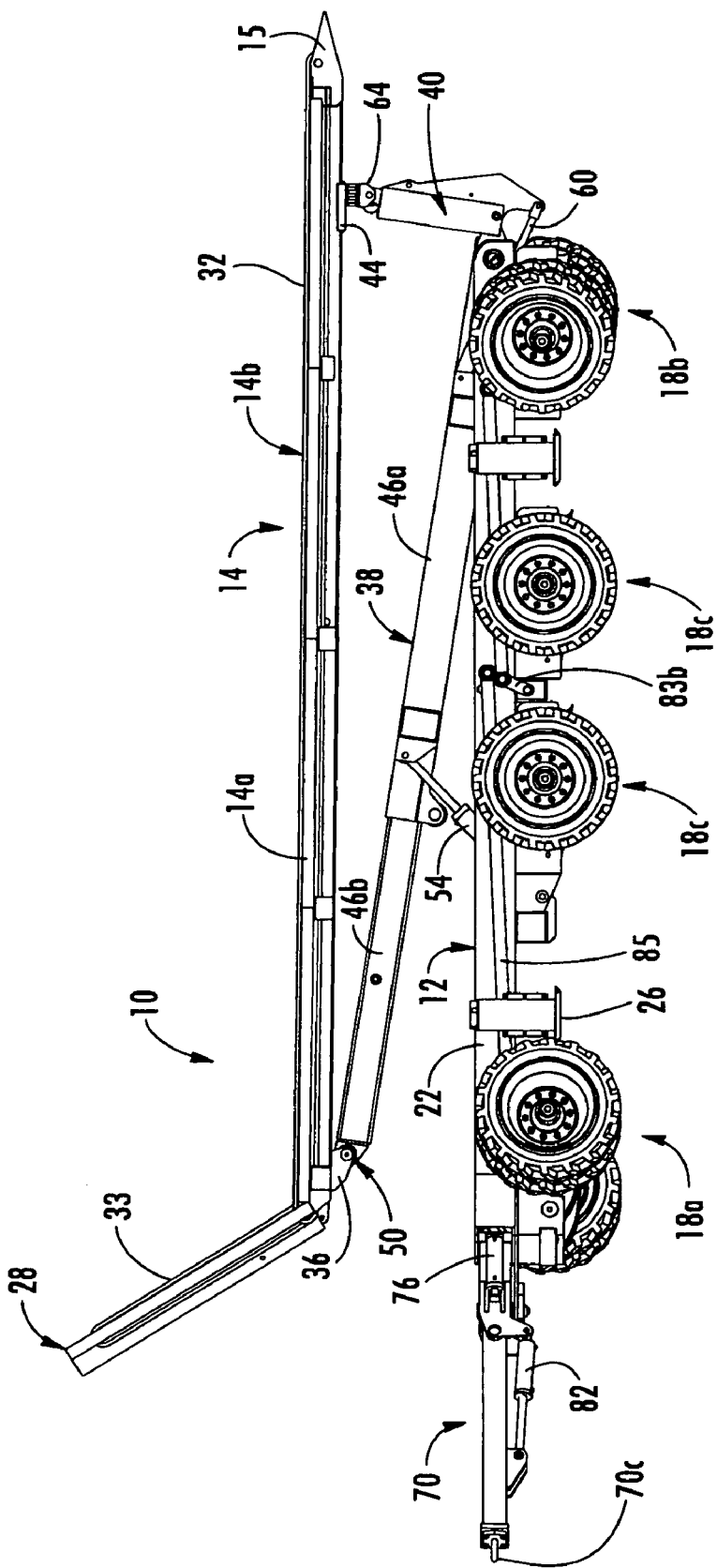
FIG. 8 is a side elevation of the cargo trailer similar to FIG. 1, with a forward platform of the deck being angled upwardly.
Figure 15:
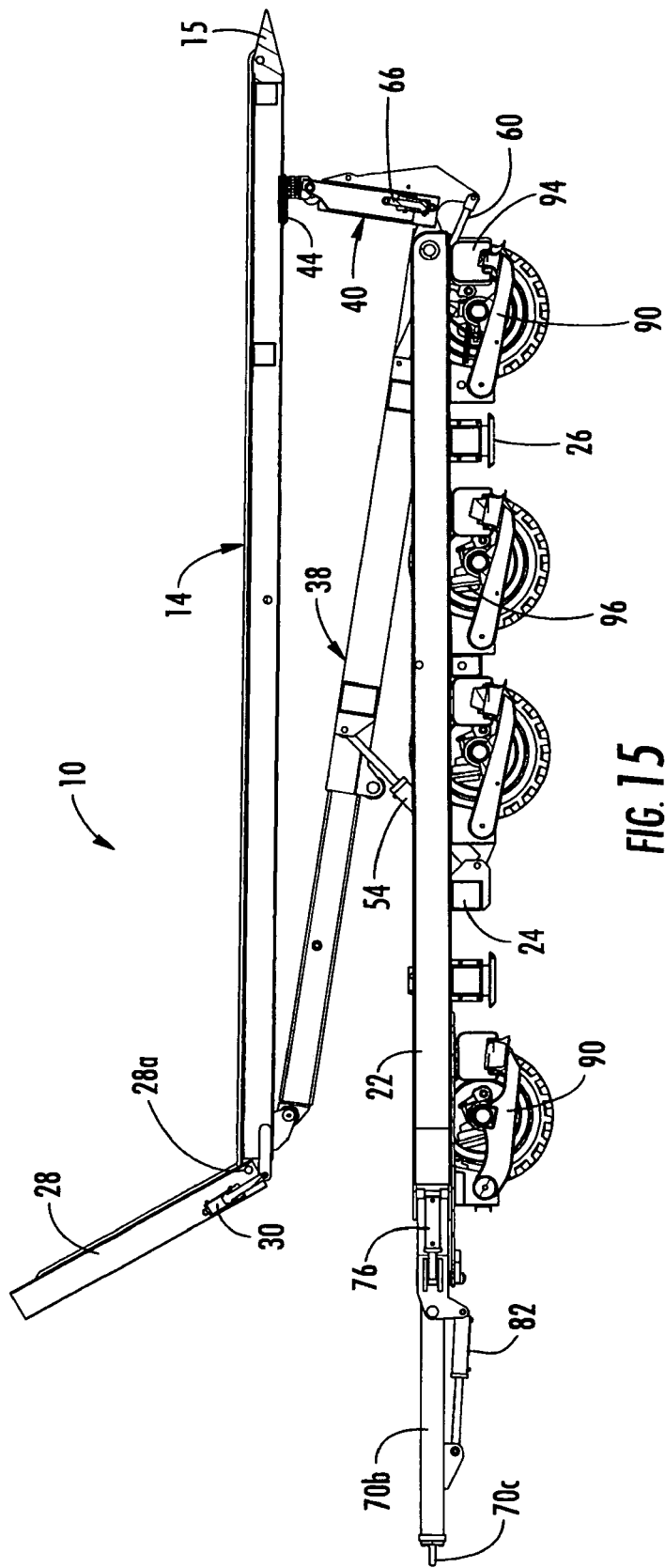
FIG. 15 is a sectional view of the cargo trailer taken generally along the line XV—XV in FIG. 11.
Figure 19:
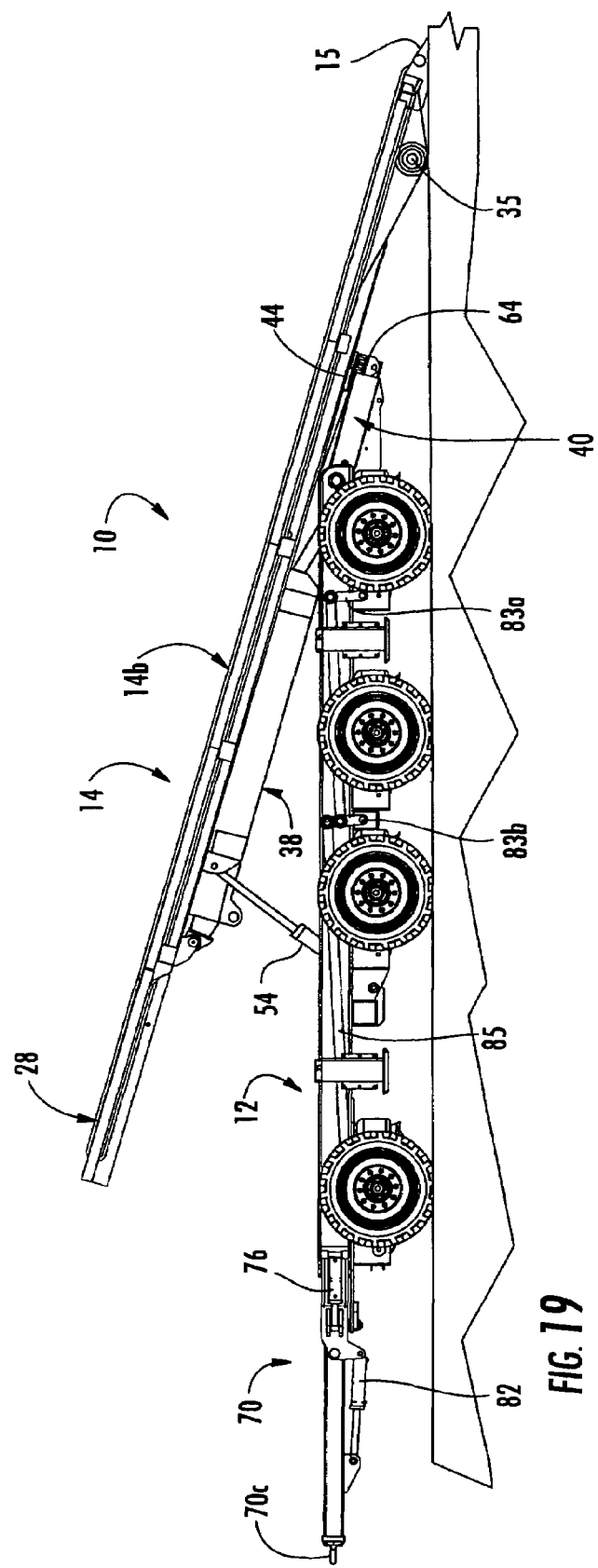
FIG. 19 is a side elevation of the cargo trailer, similar to FIG. 1, with the deck angled downward to the ground for loading of the cargo trailer.
Figure 20:
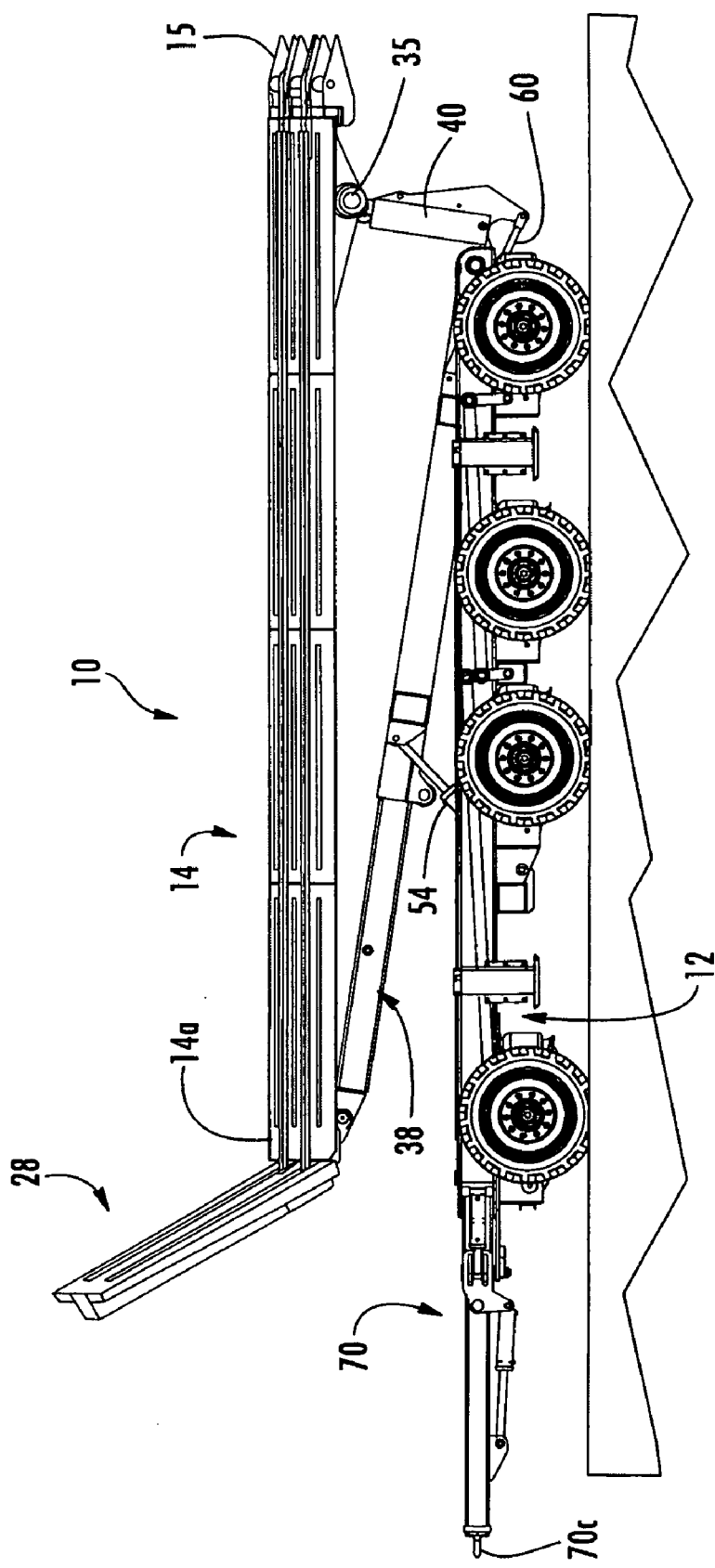
FIG. 20 is a side elevation of the cargo trailer, with the deck tilted toward the left side of the trailer.
Figure 21:
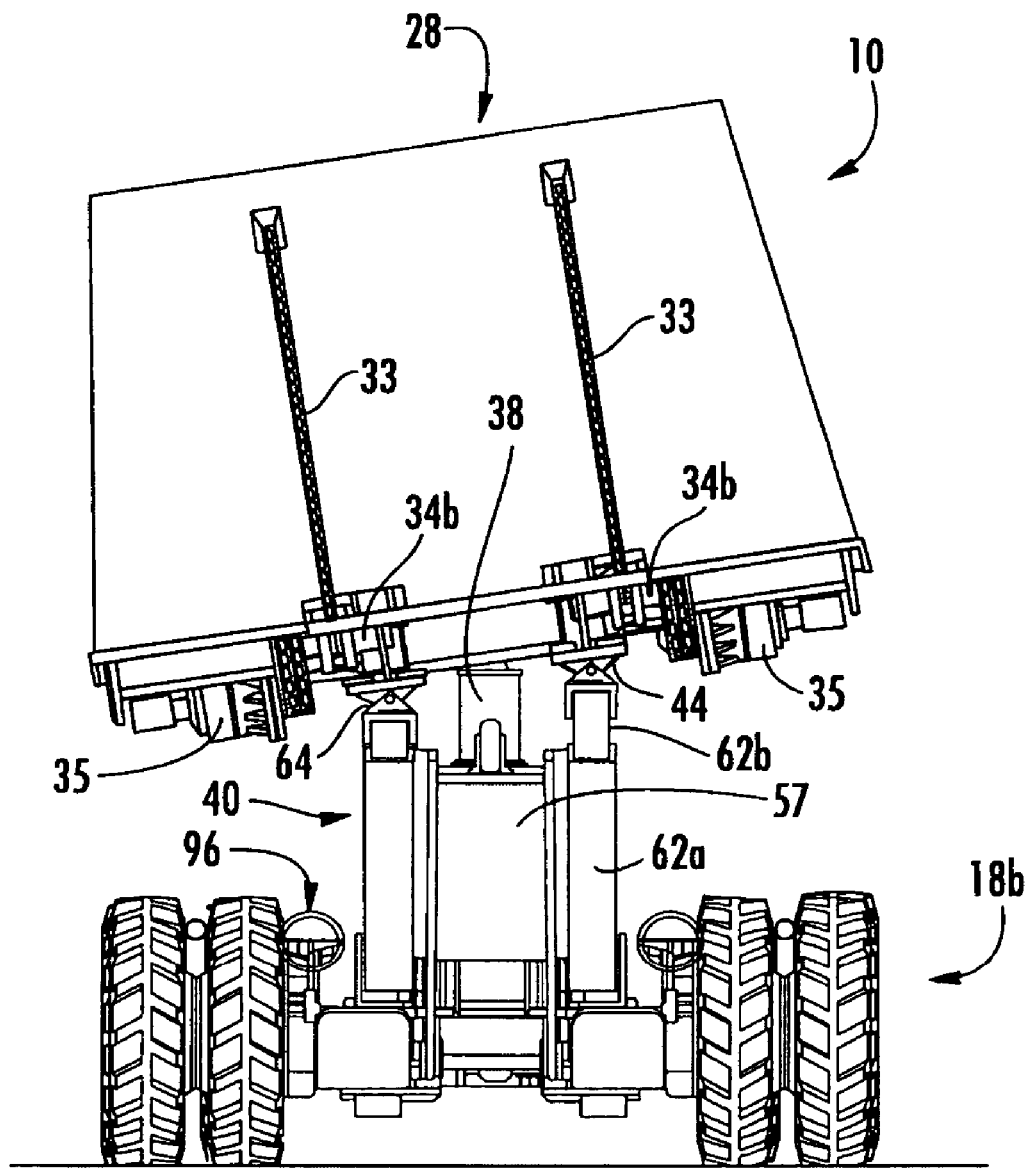
FIG. 21 is a rear elevation of the cargo trailer of FIG. 20.
Figure 22:
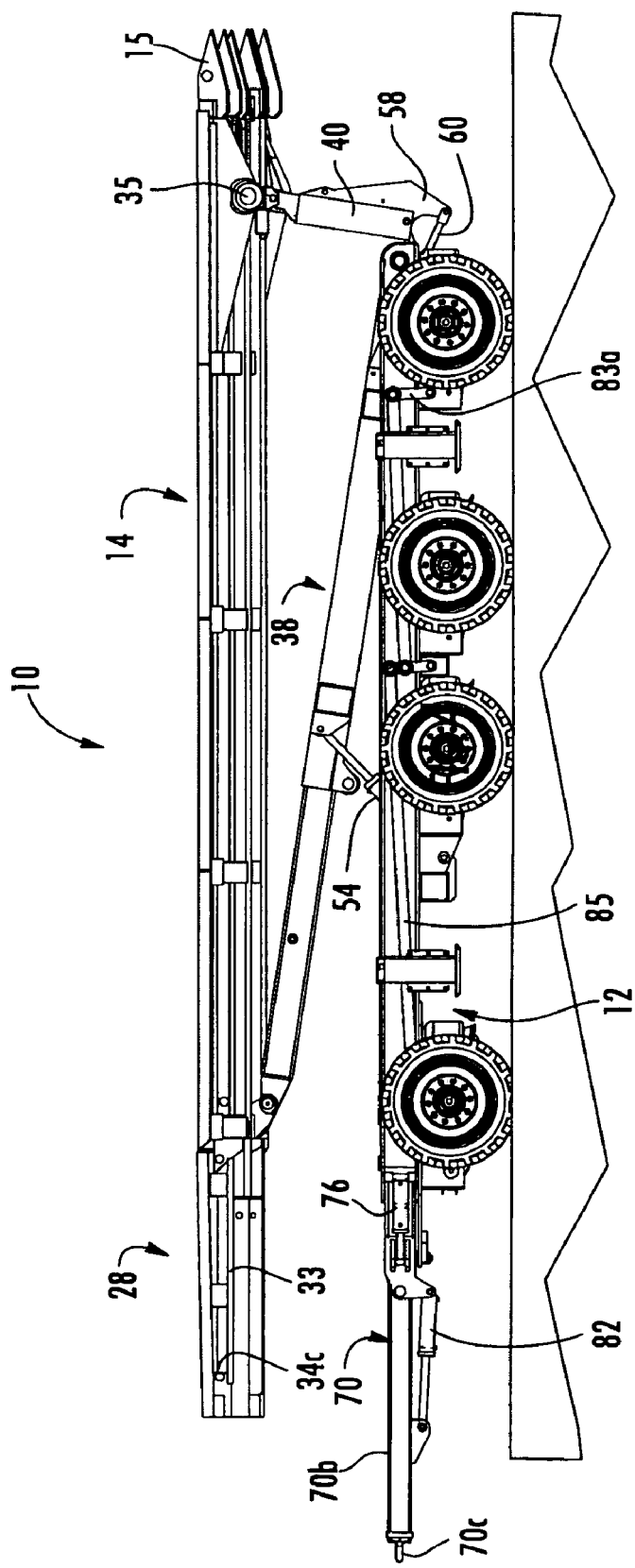
FIG. 22 is a side elevation of the cargo trailer, with the deck titled toward the right side of the trailer.
Figure 23:
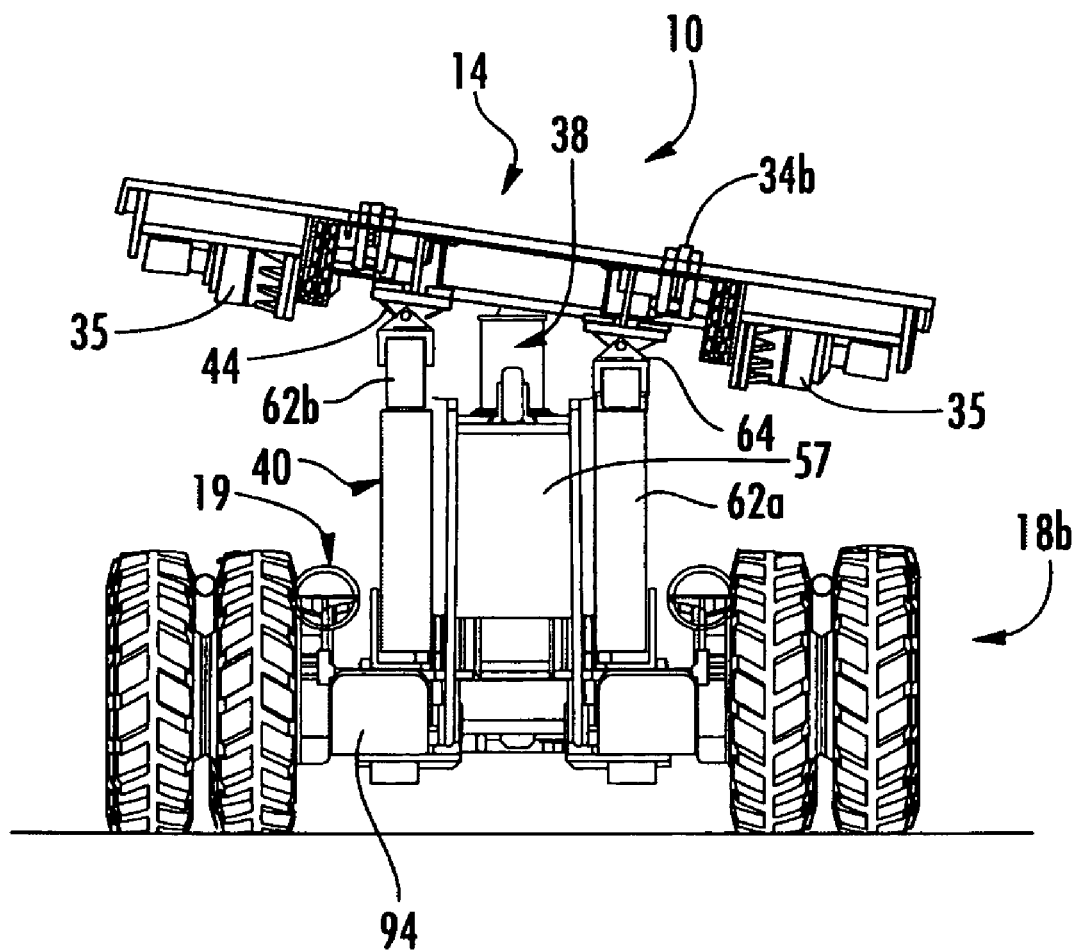
FIG. 23 is a rear elevation of the cargo trailer of FIG. 22.
Figure 24:
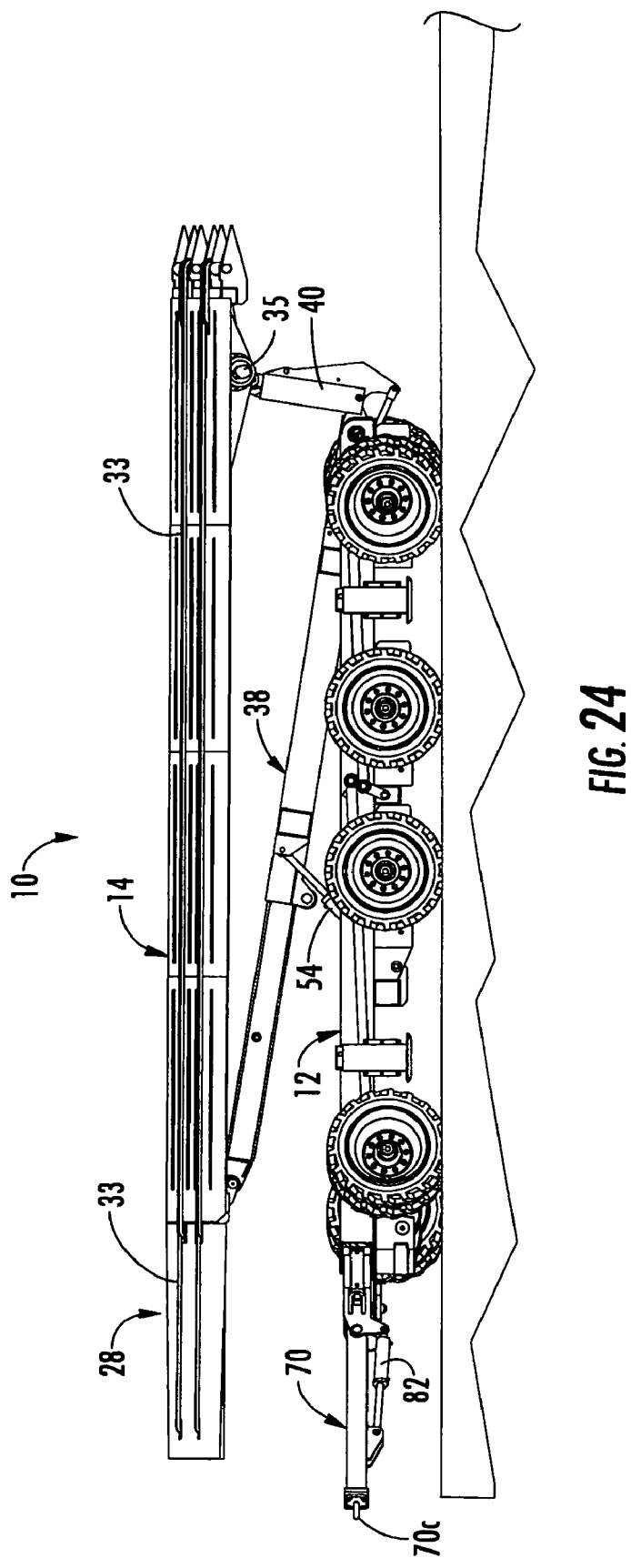
FIG. 24 is a side elevation of the cargo trailer, with the deck tilted toward the left side of the trailer.
Figure 25:
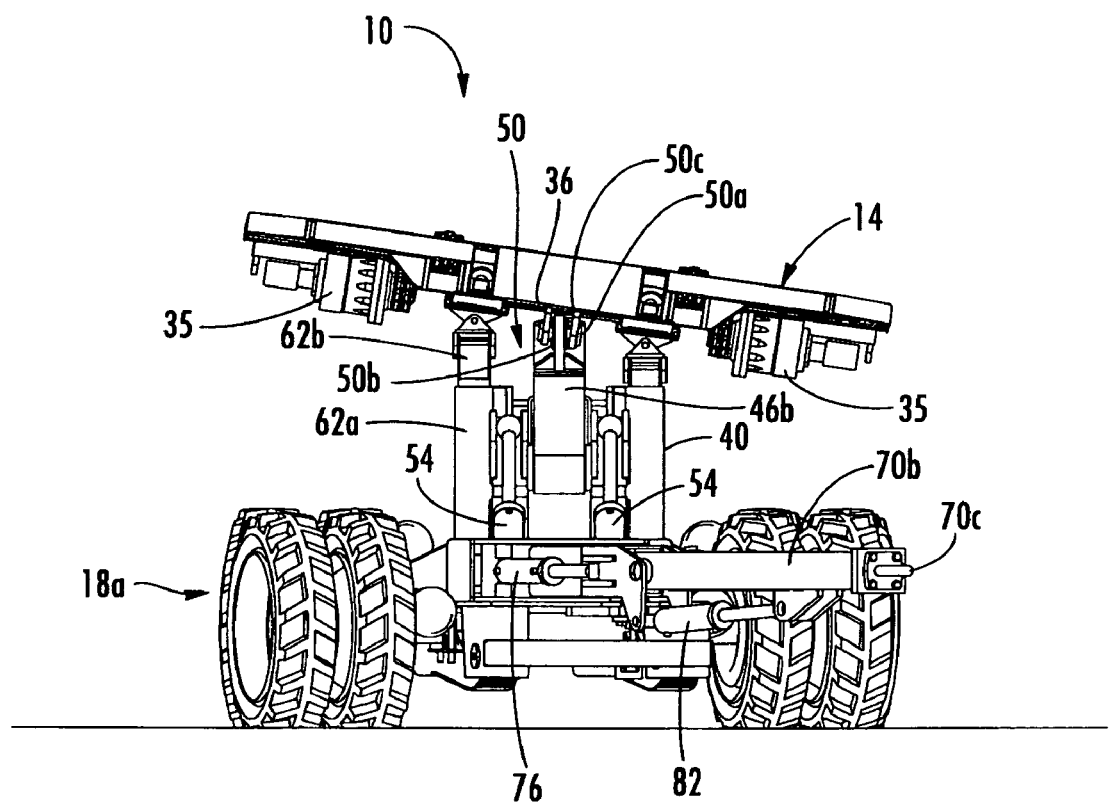
FIG. 25 is a front elevation of the cargo trailer of FIG. 24.

Deck or deck portion 14 of trailer 10 is adjustably mounted to frame 12 and is adjustable relative thereto. Deck 14 provides a generally flat support surface 14a for supporting cargo and the like on cargo trailer 10. Deck 14 may include a main deck portion 14b and a pivotable platform 28 that is pivotally mounted at a forward end 14c of main deck portion 14b to ease unloading of cargo and articles off of deck 14 and into a targeted vehicle or aircraft at which the front end of the trailer may be positioned. Platform 28 may be pivoted about a generally horizontal or laterally extending axis 28a (FIG. 15) relative to main deck portion 14b, and may be pivotable between a generally aligned orientation (as shown in FIG. 1) and an upwardly angled orientation (as shown in FIG. 8) via an actuator 30 (FIG. 15), such as a hydraulic cylinder or the like. Optionally, the forward platform of the cargo trailer may be extendable and retractable relative to the main deck portion to position the forward platform at a desired loading or unloading area, without affecting the scope of the present invention. A rear portion 14d of main deck portion 14b may include an angled or ramped end portion 15, which may be formed or configured or adapted to engage the ground and to provide a ramp at the ground when the deck 14 is tilted rearwardly and downwardly (as shown in FIG. 19) for loading of the cargo trailer, as discussed below.

Deck 14 may include one or more conveying members or bands or belts or chains 32 for conveying articles or cargo along the support surface 14a of deck 14. The conveyor belts or chains 32 may be reeved around pulleys or sprockets 34a, 34b at opposite ends 14c, 14d of main deck portion 14b, as shown in FIGS. 3, 13, 14 and 17. Platform 28 may also include one or more conveyor belts or bands or tracks 33 or the like routed or reeved around the forward pulley or roller 34a of main deck portion 14b and further around a forward pulley 34c of platform 28. The rollers or pulleys 34a, 34b, 34c may be selectively rotated to drive the conveyor belts 32, 33 to move articles along deck 14 of trailer 10, and the rollers may be rotated or the belts moved or driven via any driving means, without affecting the scope of the present invention. For example, and as shown in FIGS. 19–25, one or more hydraulic motors 35 may be mounted to deck 14 and connected to the rear pulleys 34b of deck 14 to rotatably drive the pulleys to convey objects along the deck surface 14a.

Although shown and described as having conveyor belts along the deck and platform, other means for moving and/or controlling movement of articles or objects or cargo on the deck and platform may be implemented, without affecting the scope of the present invention. For example, the deck may include a plurality of ball transfers to allow movement of the cargo containers in virtually any direction on the deck. Each of the ball transfers may be mounted on a plate under the main deck. The supporting plate may be raised or lowered by appropriate means (such as pneumatic or hydraulic means) such that when the plate is raised, the ball transfers contact the bottoms of the cargo containers to allow movement of the containers in virtually any direction. Appropriate drive rollers may also be included to move the cargo containers when supported on the ball transfers. When the supporting plate is lowered, the cargo containers will rest against the deck to resist movement along the deck.

Figure 2:
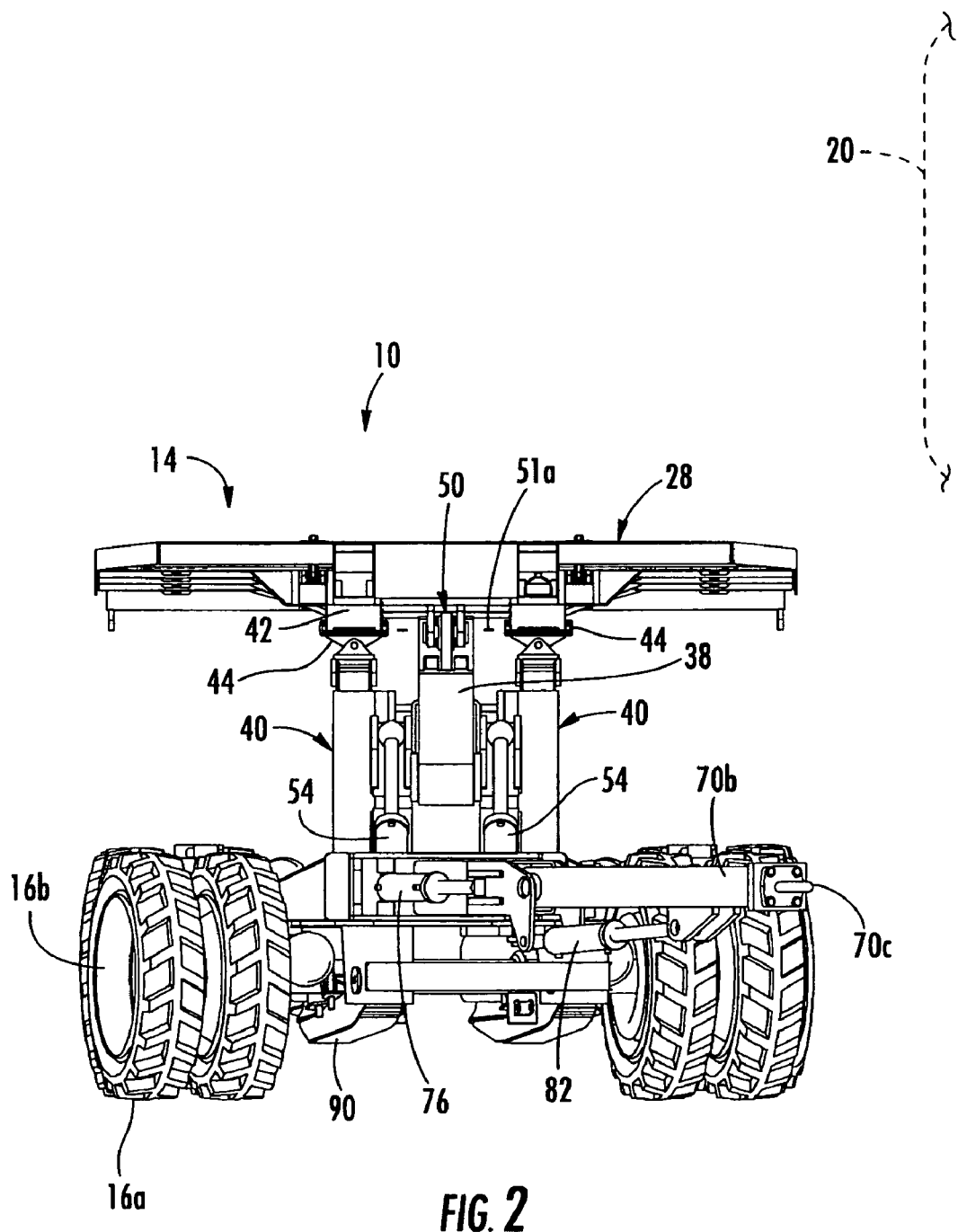
FIG. 2 is a front end elevation of the cargo trailer of FIG. 1.
Figure 5:
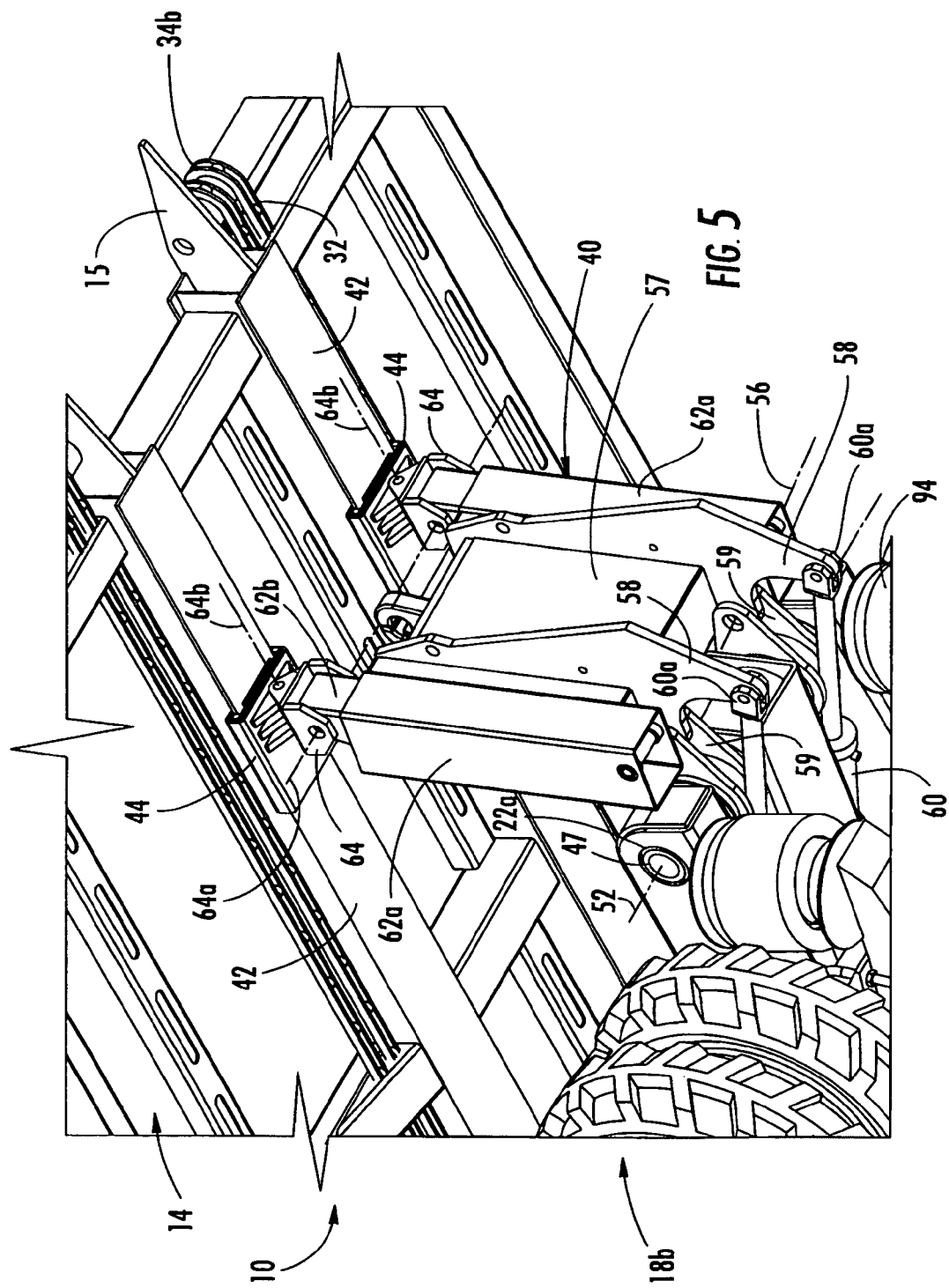
FIG. 5 is a perspective underside view of a rear portion of the cargo trailer, showing a pair of rear supports that support the deck above the frame of the cargo trailer.
Figure 6:
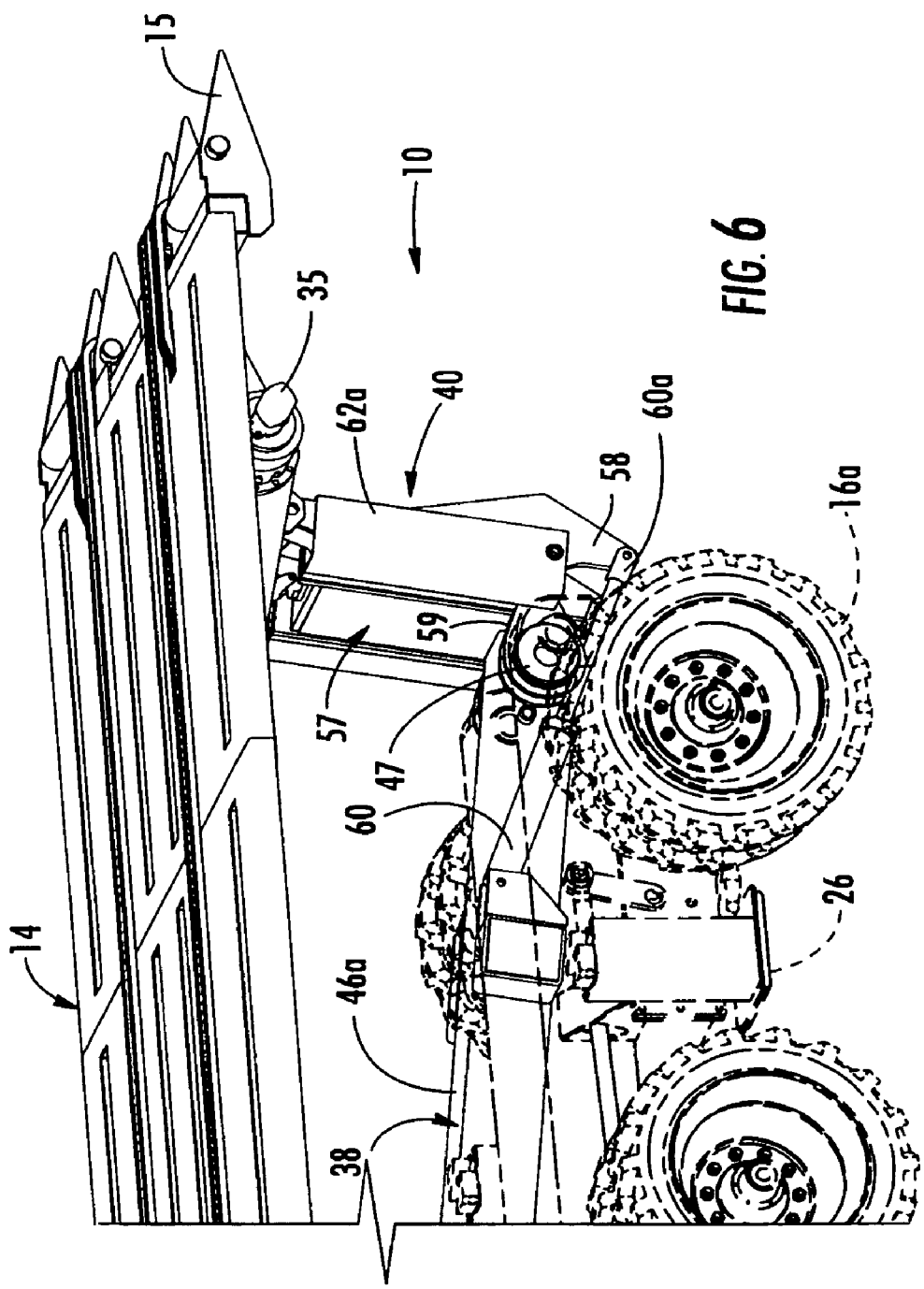
FIG. 6 is a perspective view of a rear portion of the cargo trailer showing the pivotal mounting of the boom to the frame, and with the frame and wheels shown in phantom.
Figure 7:
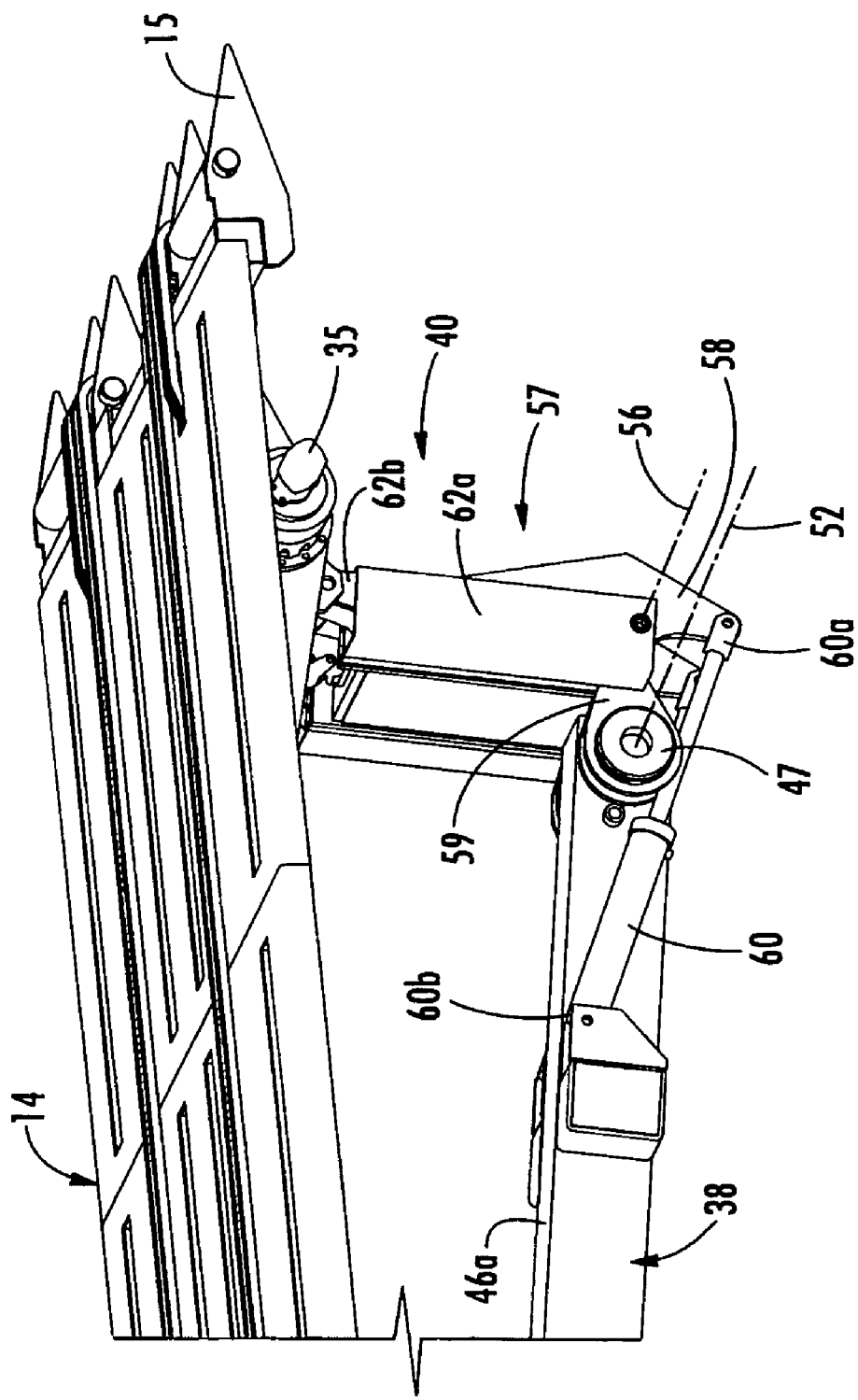
FIG. 7 is a perspective view of the rear portion similar to FIG. 6, with the frame and wheels removed to show additional details.

In the illustrated embodiment, deck 14 includes a forward bracket 36 at or near the forward end 14c of the main deck portion 14b for pivotally mounting the forward portion of the deck to a lift boom or boom member 38. Boom 38 is extendable and retractable to move deck 14 longitudinally relative to frame 12, and is pivotable relative to frame 12 and to bracket 36 to vertically adjust the forward end portion of deck 14, as discussed below. The rear portion of deck 14 may be slidably supported by a pair of rearward supports 40, which may pivot or tilt the rear portion or end 14d of deck 14. As best seen in FIGS. 2 and 5, deck 14 may include a pair of lower rails 42, which may be slidably received within sliding members 44 at the upper ends of the rearward supports 40, such that deck 14 may be slidably mounted to the upper ends of the rearward supports 40, as discussed below. Deck 14 thus may be longitudinally movable relative to frame 12 by extension and retraction of boom 38, whereby the deck 14 may slide along the slide members 44 while being supported by the rearward supports 40. The rear supports may be pivotally mounted at a rearward portion of frame 12, and may be pivotable to raise and lower and tilt the rear portion of deck 14, as also discussed below.

Figure 12:
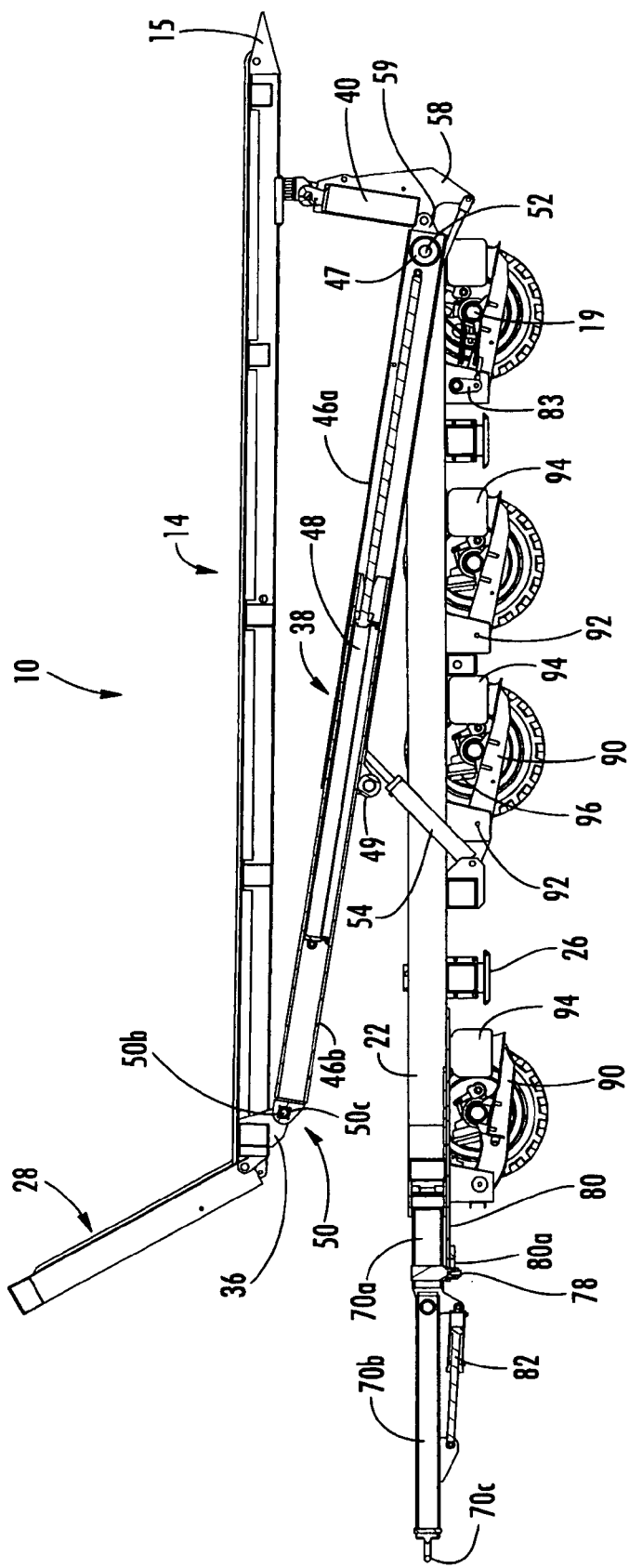
FIG. 12 is a sectional view of the cargo trailer generally along the line XII—XII in FIG. 11.
Figure 13:
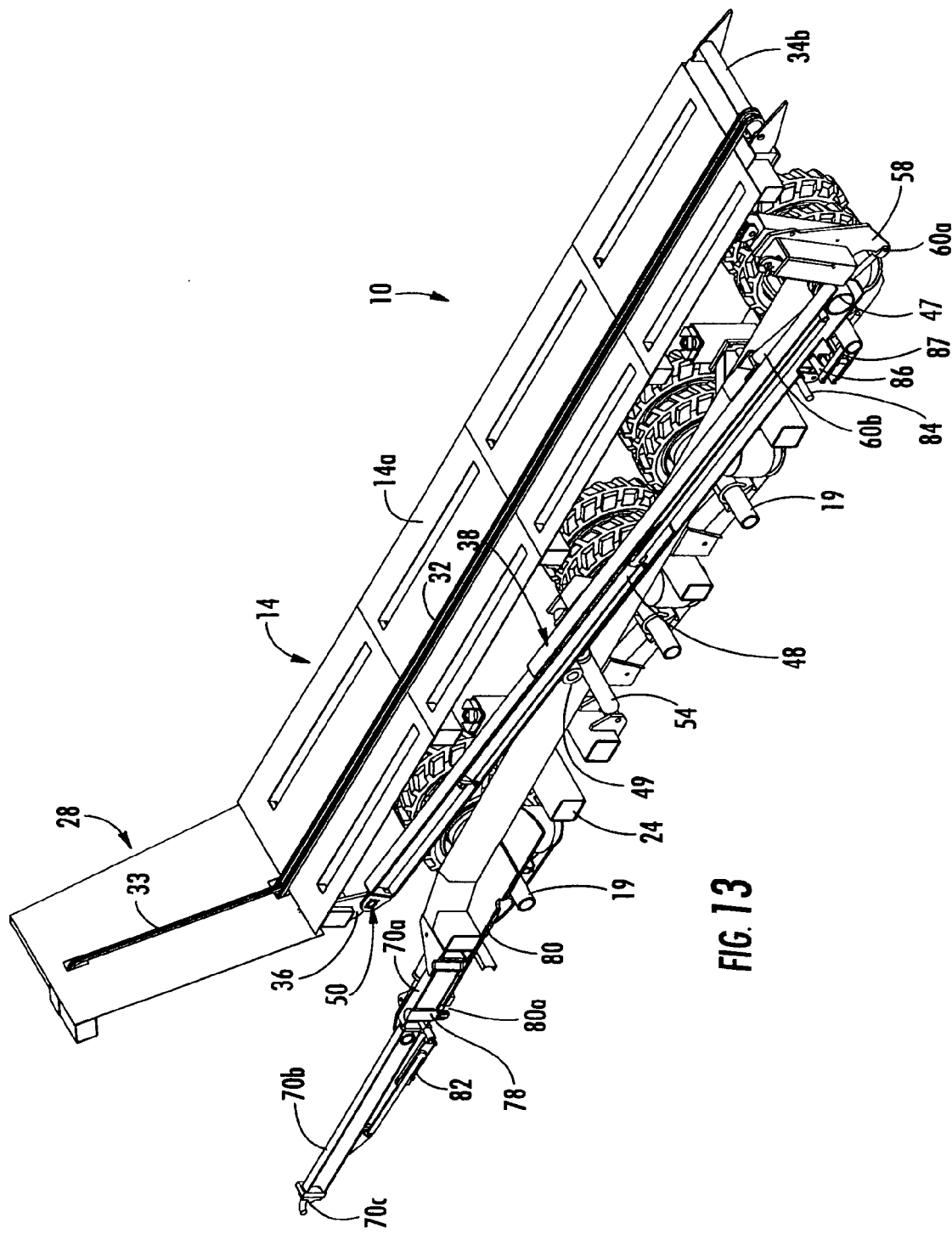
FIG. 13 is a perspective sectional view of the cargo trailer, also taken along the line XII—XII in FIG. 11.
Figure 14:
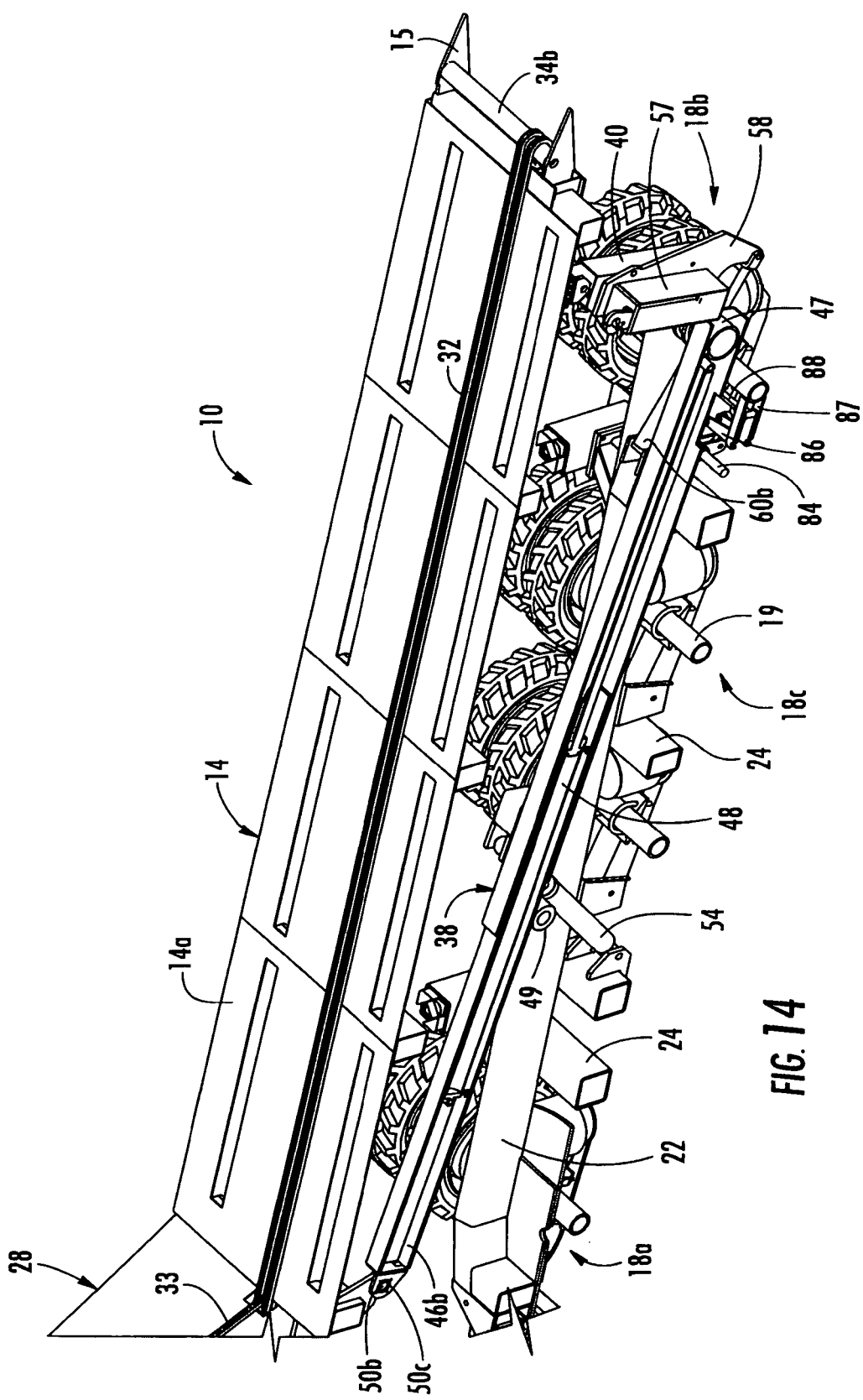
FIG. 14 is an enlarged perspective sectional view similar to FIG. 13.

Boom 38 may comprise a telescopic boom member that includes a lower or outer member 46a and an upper or inner member 46b, which are extendable and retractable relative to outer member 46a. In the illustrated embodiment, outer member 46a is attached to a pivot axle 47, which is pivotally mounted to the rearward portion of frame 12. Outer member 46a slidably receives inner member 46b therein. Inner member 46b is pivotally attached at its opposite or outer end to bracket 36 of deck 14 to support the forward end of deck 14. Inner member 46b may be extendable and retractable relative to outer member 46a via an actuator 48 (FIGS. 12–14) positioned at least partially along and within boom 38. Boom 38 may include a support roller 49 for rollingly supporting the inner boom member 46b as it is extended and retracted relative to the outer boom member 46a.

Inner or upper member 46b of boom 38 is pivotally attached to bracket 36 of deck 14 via a multi-axis or universal attachment 50, which allows for pivotal movement of deck 14 relative to boom 38 about a generally laterally extending axis 51a (FIG. 2) and about a generally longitudinally extending axis 51b (FIG. 3) to allow for tilting or angling of deck 14 relative to frame portion 12 in either a fore/aft direction or a lateral or side-to-side direction, as discussed below. For example, and as best seen with reference to FIGS. 2, 14 and 25, attachment 50 may include a pivot member 50a, which is attached to bracket 36 of deck 14 and which includes a generally spherical portion 50b. The generally spherical portion 50b may be pivotally received within a partial spherical collar member 50c at the outer end of the upper member 46b of boom 38, such that deck 14 is pivotable relative to boom 38 at attachment 50 in any direction via the ball and socket type of connection. Although shown and described as a ball member and partial spherical collar member, the multi-axis or universal attachment of the boom to the deck may comprise other attachment means, such as a coupling or attachment that is pivotable about a pair of generally orthogonal axes, without affecting the scope of the present invention.

Figure 16:
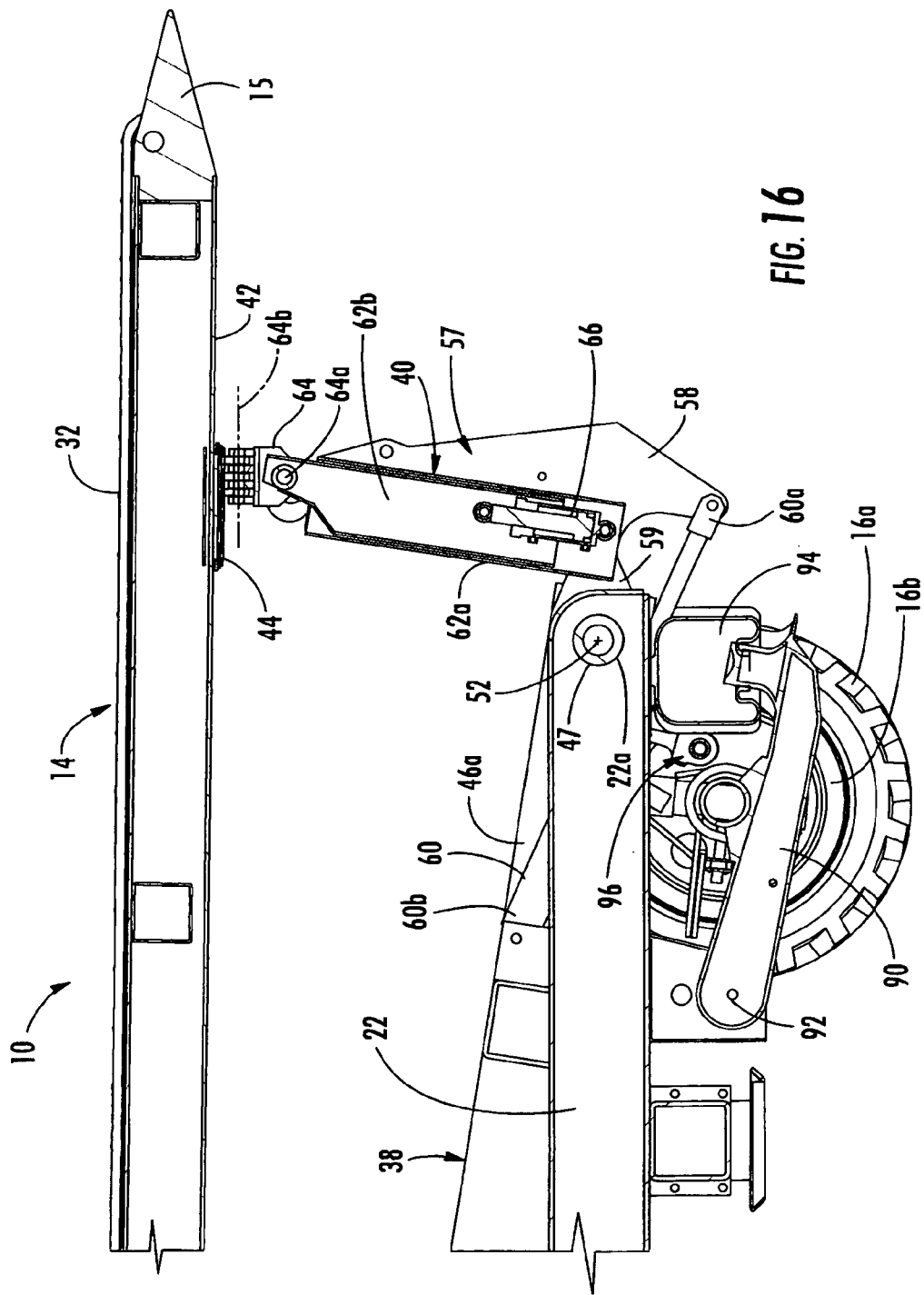
FIG. 16 is an enlarged sectional view of the rear portion of the trailer of FIG. 15.

The outer or lower member 46a of boom 38 is attached to pivot axle 47 at the rearward end or portion of frame 12 and is pivotable about a generally horizontal and laterally extending axis 52 at the rear end portion of frame 12. In the illustrated embodiment, boom 38 is fixedly attached to pivot axle 47, which is pivotally mounted to the rear portion of side members 22 of frame 12. For example, pivot axle 47 may be pivotally received within a bushing or bearing assembly or the like at a pair of openings 22a (FIGS. 5, 16 and 26) at the rear end portions of the side members 22 of frame 12. Boom 38 is pivoted about pivot axis 52 to raise and lower and pivot the deck 14 relative to frame 12. One or more actuators 54 (such as the two extendable and retractable hydraulic cylinders shown in the illustrated embodiment) may be pivotally attached to frame 12 and to outer member 46a of boom 38, and may be extendable and retractable to cause pivotal movement of boom 38 about pivot axis 52 to raise and lower the forward portion of deck 14. In the illustrated embodiment, a pair of actuators 54 are pivotally positioned at laterally opposite sides of boom 38.

Rearward supports 40 may be pivotally mounted at the rear end portion of frame 12 and may be pivotable about a generally horizontal and laterally extending axis 56 at one end and pivotally mounted to slide members 44 at the other end. In the illustrated embodiment, and as best shown in FIGS. 5–7 and 16, rearward supports 40 may be attached to a pivotable lift arm 57 that is pivotally attached to a pair of mounting brackets 59. Mounting brackets 59 are attached to and extend from pivot axle 47, which, as discussed above, is pivotally mounted to the rear of frame 12. Lift arm 57 has one or more extensions 58 that extend outwardly from pivot axis 56 and that are pivotally connected to an end 60a of a respective actuator 60, such as a hydraulic cylinder or the like. Actuators 60 are connected at their other ends 60b to boom 38, such that extension and retraction of actuators 60 causes a corresponding movement of extension 58, which, in turn, causes pivotal movement of lift arm 57 and rearward supports 40 in unison about pivot axis 56. The mounting brackets 59 thus attach or mount lift arm 57 and supports 40 to frame 12 via pivot axle 47. Because mounting brackets are attached to pivot axle 47, pivotal movement of boom 38 and pivot axle 47 (such as via extension/retraction of actuators 54) causes a corresponding pivotal movement of brackets 59 and thus of lift arm 57 and supports 40 about pivot axis 52.

Figure 9:
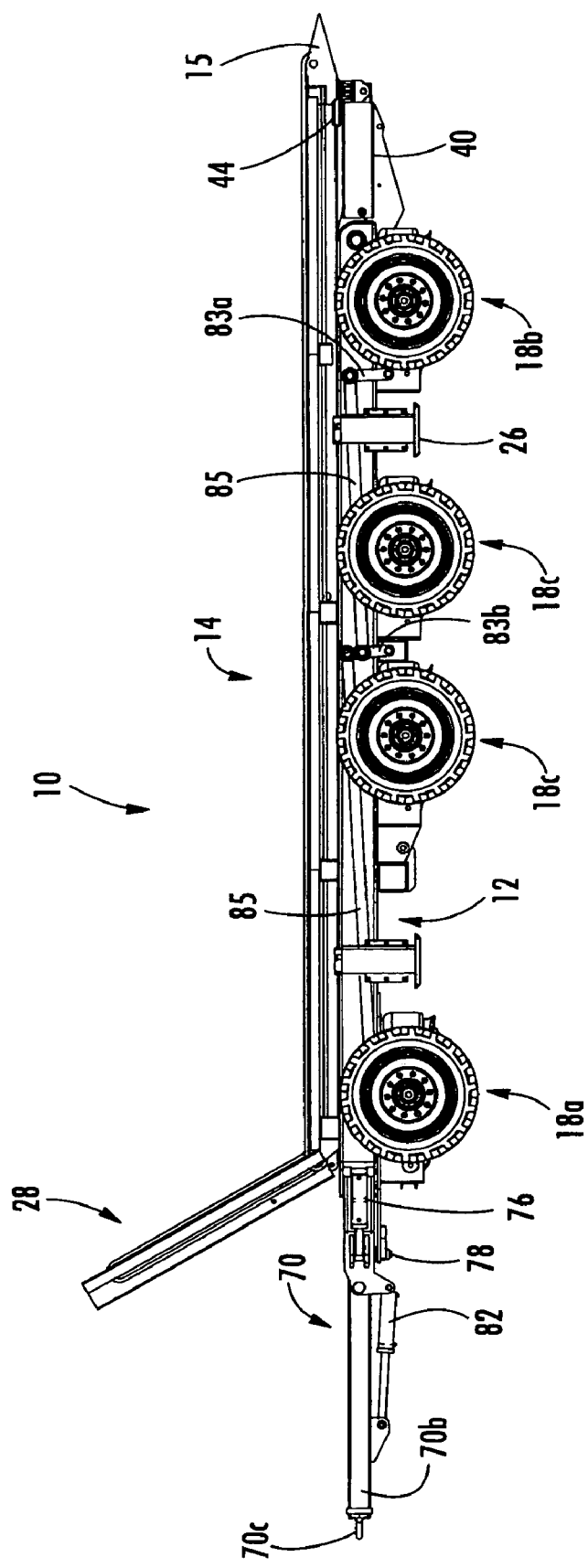
FIG. 9 is another side elevation of the cargo trailer similar to FIG. 8, with the deck in its lowered orientation.
Figure 10:
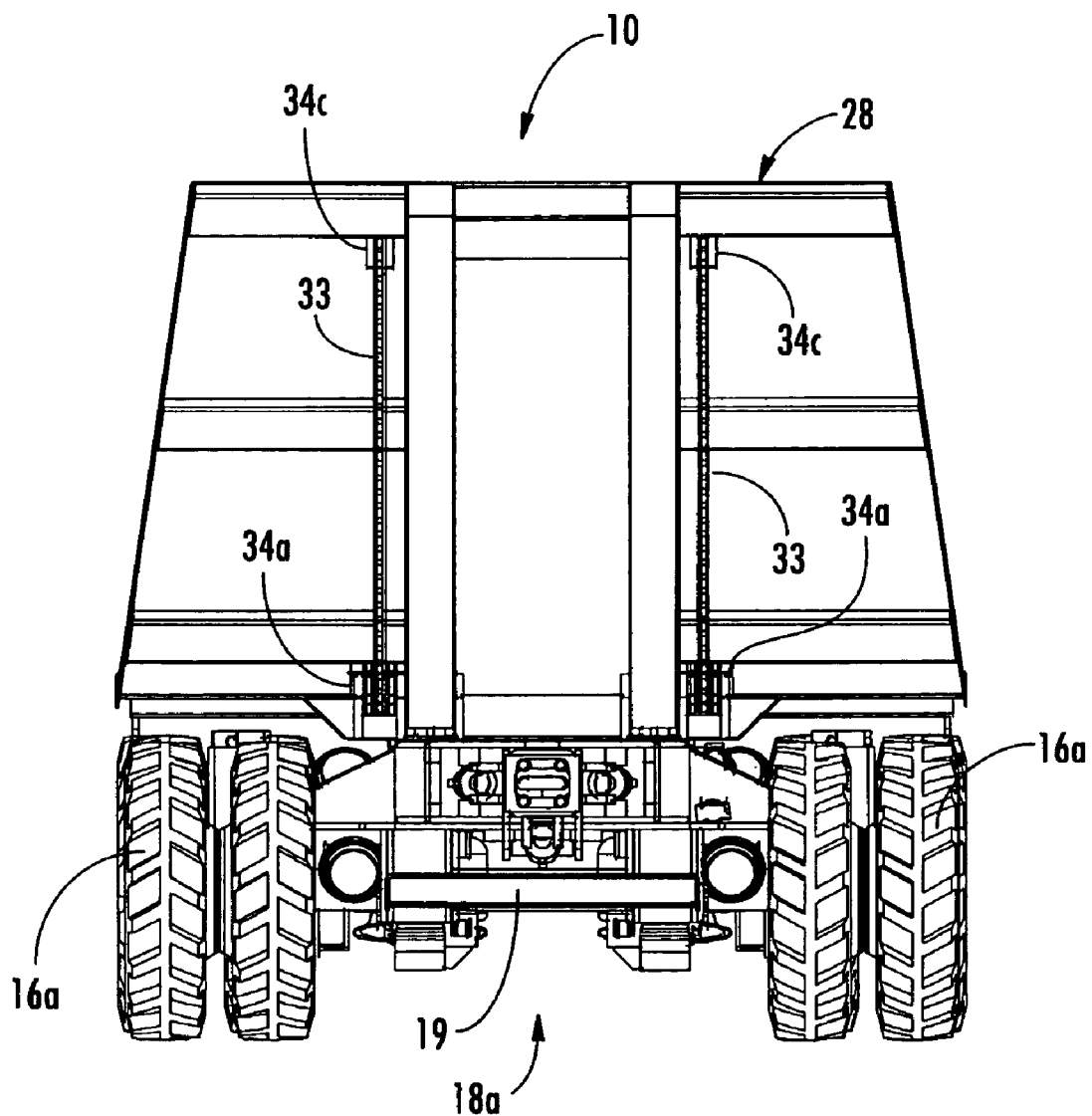
FIG. 10 is a front end elevation of the cargo trailer of FIG. 9.
Figure 11:
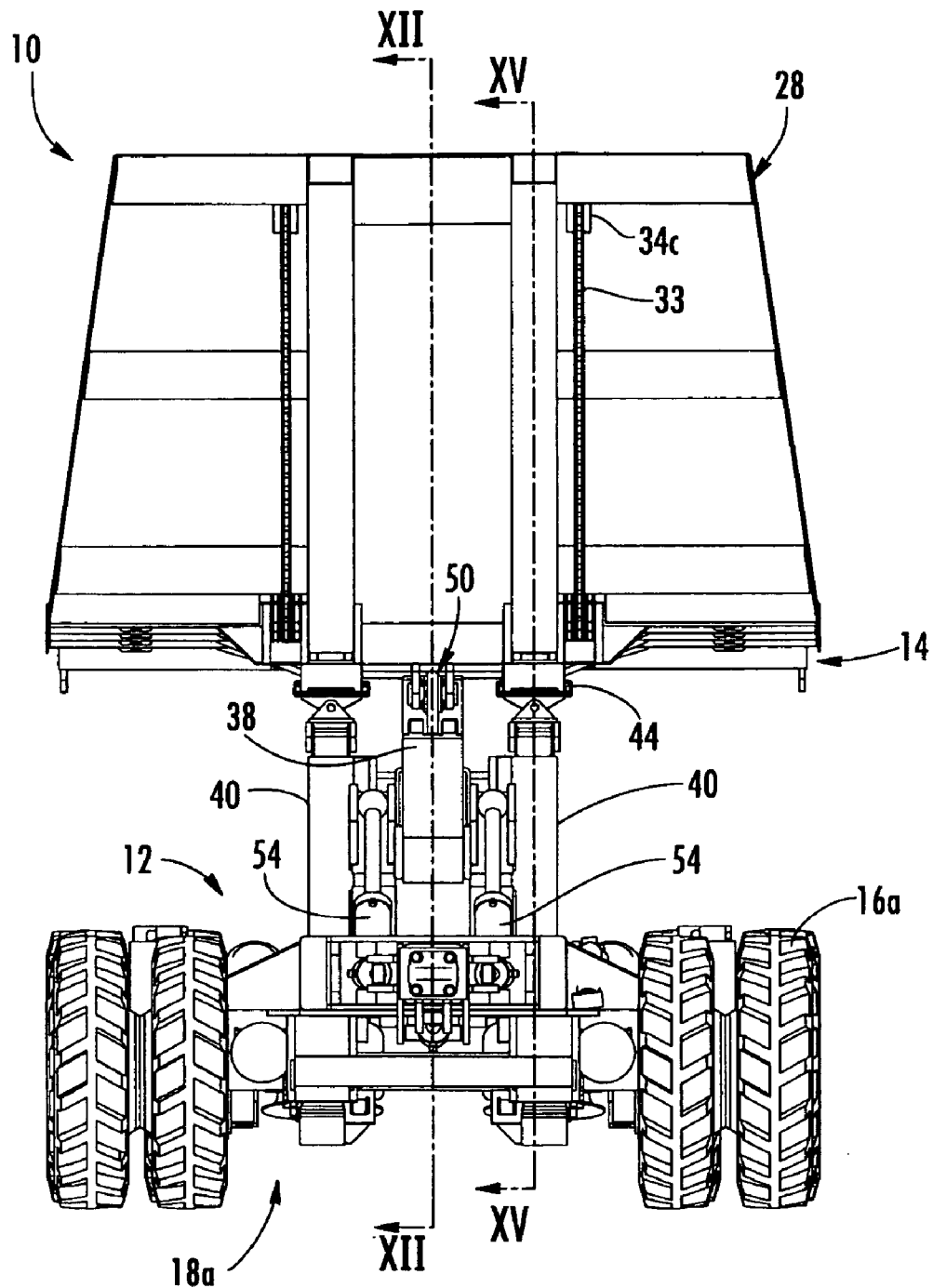
FIG. 11 is a front end elevation of the cargo trailer similar to FIG. 10, but with the deck in its raised orientation.

Lift arm 57 and both rearward supports 40 thus may be pivoted together or simultaneously between a generally upward position (as shown in FIGS. 1 and 8) and a generally horizontal position (as shown in FIG. 9) and a downwardly angled position (as shown in FIG. 19) relative to frame 12 to adjust the position and/or orientation of deck 14 relative to the frame. If deck 14 is not moved longitudinally (such as via extension and retraction of the boom 38) during pivotal movement of supports 40, then pivotal movement of rearward supports 40 causes a raising and lowering of the rear portion 14*d* of deck 14 while the slide members 44 slide along the rails 42 on the underside of deck 14. On the other hand, pivotal movement of supports 40 when boom 38 is correspondingly extended or retracted may cause raising or lowering of the rear portion of deck 14 without sliding of the slide members 44 along the rails 42 (because the deck may be moved longitudinally by the boom in a similar amount as the supports pivot), depending on the degree of extension and retraction of boom 38 and the pivotal movement of the supports 40. Also, pivotal movement of boom 38 about axis 52 causes a corresponding pivotal movement of mounting brackets 59 and thus of supports 40 about pivot axis 52. Such pivotal movement of the supports 40 may provide additional clearance between the deck and the frame when the deck is pivoted rearwardly and toward the ground (such as shown in FIG. 19). The deck thus may be raised generally vertically and/or may be moved longitudinally and/or may be tilted relative to the frame via adjustment of the boom and the rear supports.

The mounting brackets 59 position the lift arm and rearward supports rearward of the deck pivot axis 52, and, thus, may avoid potential interference between the deck and frame by enhancing the clearance between the deck and the frame when the deck is pivoted and moved rearward to lower the rear end of the deck toward and into contact with the ground (as shown in FIG. 19). However, although shown and described as being pivotally attached to the intermediate mounting bracket 59 extending from the pivot axle 47, the lift arm and/or rearward supports may be pivotally mounted directly to the rear portion of the frame, without affecting the scope of the present invention.

As best shown in FIGS. 5, 15–18, 21, 23 and 25, rearward supports 40 may comprise telescopic supports that include an outer or lower member 62*a* and an upper or inner member 62*b*, which is extendable and retractable relative to outer member 62*a*. As can be seen with reference to FIG. 5, inner member 62*b* of rearward support 40 is pivotally connected to a bracket 64 and is pivotable relative thereto about a generally horizontal and laterally extending pivot axis 64*a*. Bracket 64 is further connected at its opposite end to slide member 44 and is pivotable relative thereto about a generally longitudinally extending pivot axis 64*b*. Accordingly, the slide members 44 are attached to rearward supports via bracket 64 and are pivotable relative to the rearward supports about a pair of generally orthogonal pivot axes 64*a*, 64*b* to facilitate fore/aft tilting or pivoting of deck 14 relative to frame 12 and side to side tilting of deck 14 relative to frame 12. As shown in FIGS. 15–18, the telescopic rearward supports 40 may be extended and retracted via extension and retraction of a respective actuator 66 (such as a hydraulic cylinder or the like) positioned at least partially along and within the corresponding support 40. The actuators 66 may be independently and selectively extended and/or retracted to vertically adjust or raise or lower a respective side of the rear portion of deck 14, so as to tilt deck 14 toward one side or the other, while slide members 44 may pivot about longitudinally extending pivot axis 64*b* as the deck is tilted toward one side or the other relative to frame 12 (as can be readily seen with reference to FIGS. 20–24).

Accordingly, deck 14 may be adjusted relative to frame 12 to position the deck 14 at a desired height and angle relative to frame 12 and relative to the ground and/or the vehicle or aircraft to be loaded. In order to load trailer 10 from the ground, actuators 54 may extend to pivot boom 38 upwardly about pivot axis 52 to raise the front end of deck 14 such that deck 14 is tilted rearwardly toward the rear of the trailer and to pivot mounting brackets 59 to also pivot rearward supports 40 about pivot axis 52. Actuators 60 may be retracted to pivot rear supports 40 about pivot axis 56 to lower the upper ends of supports 40 and thus the rear end of deck 14 toward the ground. Actuator 48 of boom 38 may also be retracted to retract boom 38 and thus to move deck 14 rearwardly, whereby deck 14 may slide rearward relative to sliding members 44 until the ramped end 15 of deck 14 engages the ground (as shown in FIG. 19). When deck 14 is positioned in this orientation, the cargo or articles or the like may then be moved up the ramped portion of deck 14 and onto the deck to load the deck without having to raise or lift the articles or cargo upward and onto the deck. Once cargo is positioned at the rear of the deck, the conveyors may be activated to convey the cargo forward as desired.

When the deck is loaded, the actuators 54, 60, 48 may be actuated in the opposite direction to return the deck 14 to the transport position (such as shown in FIG. 9). After the trailer has been transported to the desired unloading area, such as adjacent to a targeted vehicle or aircraft or the like, deck 14 may be elevated to the desired level for unloading of trailer 10 and loading of the targeted vehicle. In order to raise deck 14 upward to the desired height, actuators 54 may again be extended to pivot boom 38 about pivot axis 52 to elevate the forward end of deck 14 above frame 12. The rear end of frame 14 may be raised by extension of actuators 60 to pivot rearward supports 40 about pivot axis 56. Sliding members 44 may slide along rails 42 as rearward supports 40 are pivoted toward the upright position (such as shown in FIG. 1).

When positioned at the desired height, which is determined by the extension/retraction of actuators 54 and the extension/retraction of actuators 60, the deck 14 may be positioned generally at or near the targeted unloading area. The actuators 66 of rearward supports 40 may be independently extended or retracted to further vertically adjust the rearward portion of the deck and to level deck 14 or to otherwise tilt deck 14 to a desired angle relative to frame 12 and/or the targeted vehicle. The pivotable attachments of bracket 36 to boom member 46*b* and of slide members 44 to brackets 64 allows for pivotal movement or tilting of deck 14 about the longitudinal pivot axis 51*b* extending longitudinally along deck 14 to facilitate side to side tilting of the deck for aligning or leveling the deck. Likewise, the pivotal attachments of bracket 36 to boom member 46*b* and of bracket 64 to the upper end of support member 62*b* allows for pivoting of deck 14 about laterally extending pivot axes 51*a*, 64*a* to facilitate forward and aft tilting or pivoting or angling of deck 14 relative to frame 12.

The deck of the cargo trailer of the present invention thus may be adjusted to adjust the side to side tilt of the deck and/or the fore/aft tilt of the deck and/or the longitudinal position of the deck and/or the elevation of the deck relative to the frame via the substantially universally adjustable three point connection of the deck to the frame. The tilt or position or orientation or elevation of the deck may be adjusted irrespective of the initial position or orientation of the deck relative to the frame. The actuators 54, 47, 60 and 66 may be independently actuated or extended/retracted to adjust the angle or tilt or position or orientation or elevation of deck 14 relative to frame 12 to achieve the desired result or position or orientation or elevation of deck 14, or the actuators may be controlled together, without affecting the scope of the present invention. The actuators or hydraulic cylinders may be extended or retracted via pressurized fluid from a pump powered or driven by an engine or motor. The motor, pump and control valves may be positioned on the trailer or on the towing vehicle, without affecting the scope of the present invention.

Figure 28:
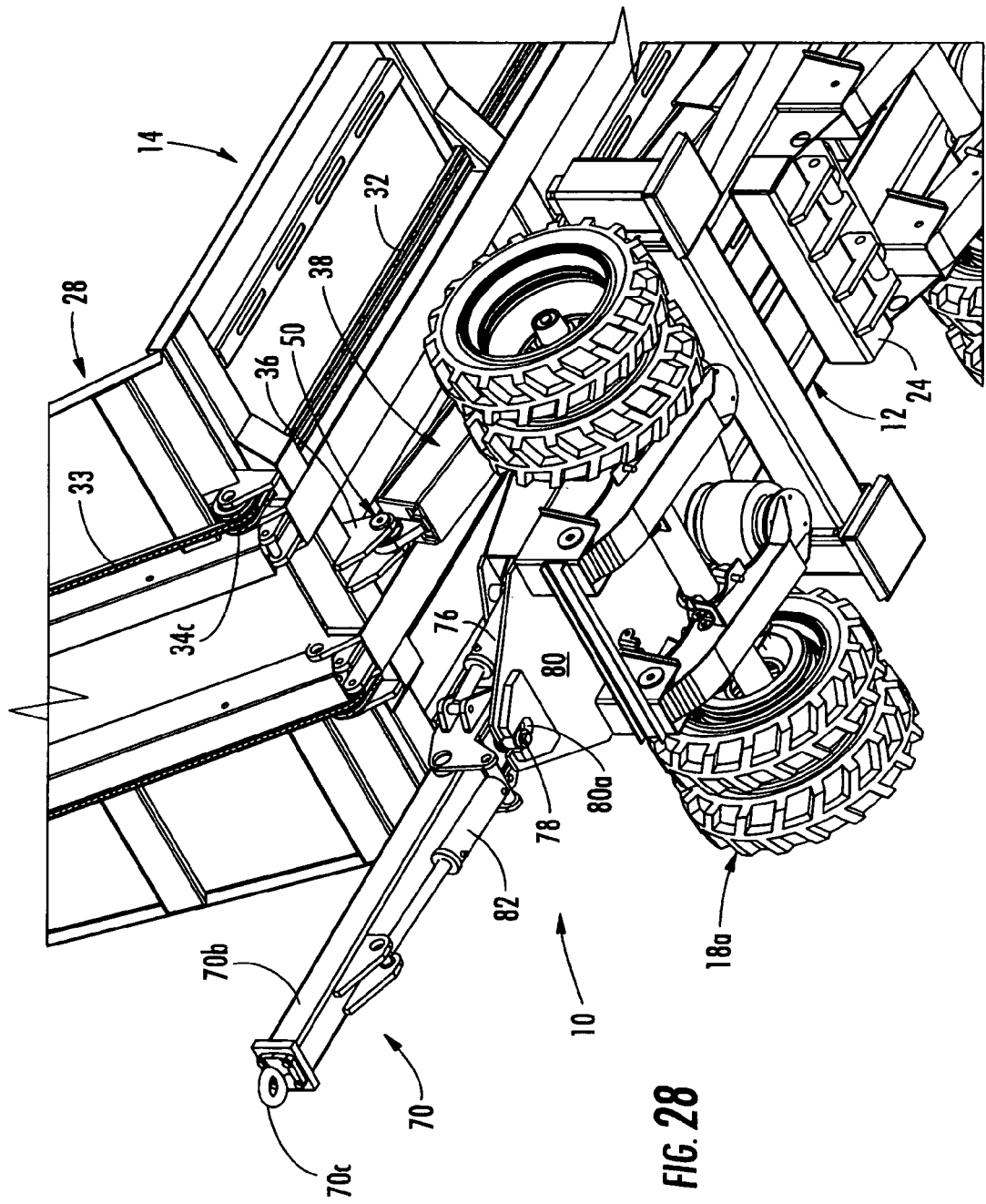
FIG. 28 is an underside perspective view of the front end portion of the cargo trailer of the present invention.

Cargo trailer 10 may be towed or moved by a towing vehicle 11 connected to a tow bar or draw bar or hitch member 70 of trailer 10. In order to enhance maneuverability and steering of cargo trailer 10, front axle assembly 18a may be pivotally mounted to the forward end of frame 12 and may be pivotable about a generally vertical pivot axis 72 relative to frame 12 to turn or steer cargo trailer 10. As best shown in FIGS. 26 and 28, hitch member 70 may be pivotally mounted to the front end of frame 12 and be pivotable about a second generally vertical pivot axis 74, which is positioned forwardly of pivot axis 72 for front axle assembly 18a. Hitch member 70 thus may be pivotable side to side relative to frame 12 about pivot axis 74 when pulled in either direction by the towing vehicle or when pivoted via extension or retraction of one or more steering actuators 76, such as hydraulic cylinders or the like, and discussed below.

As best shown in FIG. 28, hitch member 70 may include a guide pin or steering pin 78 extending downwardly therefrom and received in a slot 80a at a forward end of a base or plate or dolly 80 of axle assembly 18a. As can be seen with reference to FIGS. 26–28, as hitch member 70 is pivoted about pivot axis 74 toward one side or the other of frame 12, steering pin 78 engages and urges against plate 80 and causes a corresponding pivotal movement of plate 80 and thus of front axle assembly 18a about the other pivot axis 72. Pivot axis 74 is positioned generally forwardly of pivot axis 72, while pin 78 and slot 80a are likewise positioned forwardly of pivot axis 74. The cam follower/slot arrangement allows for movement of pin 78 along slot 80a as the pin 78 is arcuately moved through a different arcuate path than slot 80a of plate 80. The steering arrangement of trailer 10 thus provides enhanced steering of trailer 10 because, as hitch member 70 is pivoted toward one side or the other, the pin 78 functions to turn the front axle assembly 18a toward that side at some angle more suitable for the trailer to follow or track properly behind the tow vehicle or tractor. This is opposed to known trailer designs where the hitch member and the axle assembly pivot about the same axis and the trailer does not track the tow vehicle but swings inside of the turning radius of the tow vehicle.

In the illustrated embodiment, hitch member 70 may be pivoted about pivot axis 74 via one or more actuators 76 that may extend and retract relative to one another to pivot hitch member toward one side or the other of frame 12. Such pivotal movement of the hitch member by the actuators mounted to the trailer frame allows for independent steering of the front axle assembly without having to wait for the towing vehicle to turn and pull at the hitch member to cause such steering. The steerable front axle assembly of the present invention thus provides for enhanced turning/steering of the trailer. Optionally, the actuators 76 may be substantially held or fixed or locked at a desired degree of extension to substantially lock the drawbar or hitch member 70 about axis 74, such as when hitch member 70 is in a substantially straight ahead position, to further enhance the turning of the trailer, such as when the front and rear wheels and tires are raised above the ground, as discussed below. Optionally, the actuators 76 may be extended and retracted to move or swing the trailer while the tow vehicle is stationary so that the rear of the trailer may be moved to align with the airplane or loading dock for loading or unloading cargo from or onto the trailer.

Hitch member 70 may include a base portion 70a pivotally attached to frame 12 and a hitching or attaching portion 70b pivotally attached to base portion 70a and pivotable about a generally horizontal pivot axis 71, such that a towing end of hitching portion 70b may be vertically adjusted relative to base portion 70a and frame 12. As shown in FIG. 28, an actuator 82 may be pivotally connected between base portion 70a and hitching portion 70b, and may be extended and retracted to pivot hitching portion 70b about pivot axis 71 to vertically adjust the hitching or attaching end 70c of hitch member 70 relative to frame 12. Such a controlled lifting mechanism for the hitch member may substantially ease attachment of the hitch member to the towing vehicle. Also, similar to actuator 76, discussed above, actuator 82 may be substantially fixed or locked in a desired degree of extension to substantially lock or fix the position of hitch member 70 about pivot axis 71, to further enhance the steering or turning of the trailer.

Optionally, the rear axle assembly 18b may also be steerable or turnable relative to frame 12 via a steering system or mechanism 80. For example, and with reference to FIG. 27, steering mechanism 80 may comprise a linkage or connecting member 85 that extends from front axle assembly 18a to rear axle assembly 18b and is operable to steer or turn the rear wheels and tires or the rear axle 19 in a direction generally opposite to the turning or steering direction of the front wheels or tires. Linkage 85 may extend longitudinally along a side of the frame 12 and may cause rotation of a cross member or linkage 84 via a connecting link 83a when linkage 85 is moved longitudinally by turning of the front wheels or axle assembly. Cross member 84 is connected to another linkage assembly 86, such that pivotal movement of cross member 84 causes turning of the tires 16a and wheels 16b of the rear axle assembly 18b relative to the axle 19.

Figure 27:
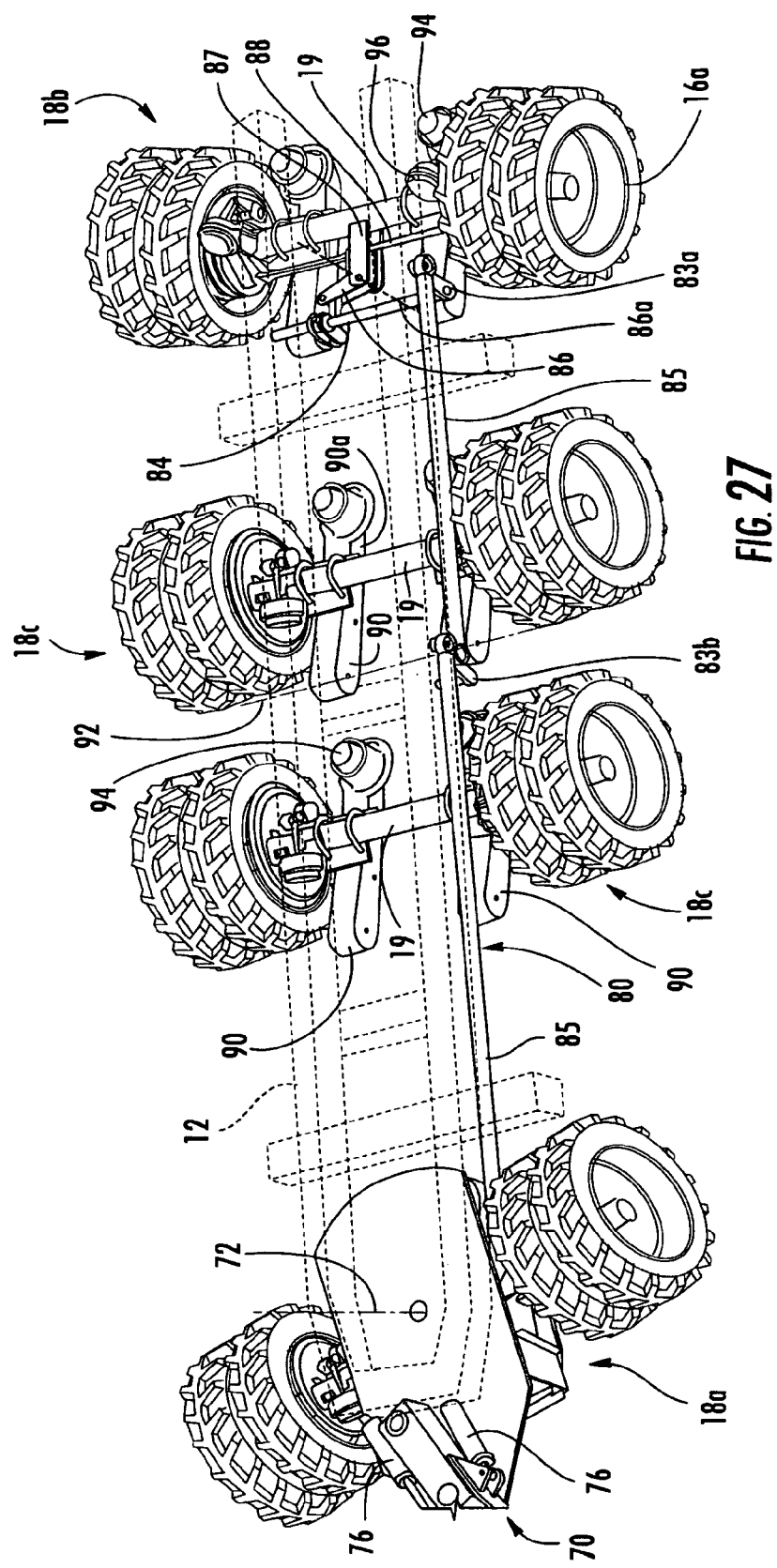
FIG. 27 is a perspective view of the cargo trailer of FIG. 26, showing the steering mechanism of the cargo trailer.

As can be seen in FIGS. 4 and 27, pivotable linkages 86 may be pivotally attached to a bracket 87 attached to the rear axle 19 and may be pivotable about a generally vertical pivot axis 86a at bracket 87. Rotation of cross member 84 pushes or pulls at the ends 86b of the generally L-shaped linkages 86 to cause a corresponding pivotal movement of linkages 86 about pivot axis 86a to move a steering rod 88 to steer the rear tires 16a and wheels 16b relative to the axle 19 in one direction or the other. As shown in FIG. 27, longitudinally extending connecting linkage 85 may be supported at or near the central region of the frame 12 via a pivotable link or arm 83b that allows fore/aft or longitudinal movement of connecting linkage or linkages 85 via pivotal movement of the arm 83b when the forward linkage is moved by steering of the front axle assembly.

For example, and with reference to FIG. 27, when front axle assembly 18a is turned toward the left side of the frame 12, connecting linkage 85 is moved rearwardly along the side of the frame 12, which causes a corresponding clockwise rotation of cross member or linkage 84. The rotation of cross member 84 pulls at linkages 86 to cause pivotal movement of linkages 86 about pivot axis 86a, which further causes movement of the steering rod 88 toward the right side to turn the rear wheels toward the right side or toward the opposite direction of the front wheels. Turning in the other direction is accomplished in a similar manner, except that linkage 85 pulls forwardly to rotate cross member 84 in the counter-clockwise direction, which pushes at linkage 86 to move steering rod 88 to the left to steer the rear wheels to the left.

Although shown and described as a steering mechanism with mechanical linkages, other steering systems or mechanisms may be implemented to steer the rear wheels of the trailer, without affecting the scope of the present invention.

Optionally, for example, the steering system or mechanism may comprise other steering means, such as a master/slave hydraulic steering system or the like, without affecting the scope of the present invention. Optionally, the rear axle assembly may comprise a cam follower/slot arrangement or mechanism to steer the rear axle assembly similar to the manner described above with respect to the front axle assembly.

The hitching arrangement and steering system of the cargo trailer of the present invention facilitates enhanced turning or steering of the trailer and, thus, enhanced maneuverability of the trailer. As shown in FIG. 29, the steering system of the present invention allows the trailer 10 to substantially follow or track the path of the towing vehicle 11 via the dual axle steering and via the steering mechanism of the front axle assembly. The trailer thus may generally follow the path of the towing vehicle and may not substantially cut the corners as the vehicle is driven around a curve or turn. The steering system of the present invention also provides an enhanced or tighter turning radius over conventional trailers.

As can be seen with reference to FIGS. 12, 15–18 and 27, the axles 19 of axle assemblies 18a–c may be mounted to pivotable mounting arms 90, which may be pivotally mounted to frame 12. Mounting arms may pivot about a respective generally horizontal axis 92 to allow the axles 19 and tires 16a and wheels 16b to move up and down relative to frame 12 as the trailer travels along the road or path. The suspension system may include shock absorbers or pneumatic shocks or drums 94 at the ends 90a of arms 90 opposite to the pivot axes 92 to dampen the movement of the axles about the pivot axes 92. As can be seen in FIGS. 12, 15, 16, 21, 23 and 27, at least some of the axle assemblies may include individual braking systems or devices or mechanisms 96, such as pneumatically powered brakes or the like, which are operable to brake the wheels of the respective axle assemblies as desired.

Optionally, the axle assemblies 18 of trailer 10 may be vertically adjustable axle assemblies, such that the axles (and wheels and tires attached thereto) may be selectively vertically adjustable relative to one other and relative to the frame 12 of the cargo trailer 10. For example, the axles 19 and pivotable support arms 90 of each axle assembly 18 may be selectively pivoted about their respective pivot axis 92 via an actuator or the like. When pivot arms 90 are pivoted about the respective pivot axis 92, the respective axle and wheels attached thereto may be raised or lowered relative to frame 12. Such pivotal movement of the pivot arms 90 may be provided by one or more actuators, such as pneumatic actuators or the like, mounted between frame 12 and ends 90a of pivot arms 90 opposite to the pivot axis 92 (such as where the pneumatic shock absorbers are in the illustrated embodiment). Accordingly, the axle assemblies may be selectively raised and lowered relative to the other axle assemblies to provide enhanced maneuverability and/or traction and/or economy of the trailer during use in various environments or surfaces.

For example, during typical substantially level road surface driving, the center axle assemblies 18c may be selectively raised upwardly relative to frame 12 and the front and rear axle assemblies 18a, 18b, such that the trailer 10 is supported on the road by the tires, wheels and axles of the front and rear axle assemblies 18a, 18b. Such an arrangement may provide a more economical means of travel along substantially level terrain where the additional axle assemblies may not be required. Optionally, the front and rear axle assemblies 18a, 18b may be selectively raised upwardly relative to the center axle assemblies 18c and relative to frame 12, such that the trailer is supported by the tires, wheels and axles of the center or central axle assemblies 18c. Such an arrangement may be desired in highly uneven terrain, such as off road type terrain and the like, to allow for a greater degree of tilting of the trailer as it is moved over the terrain. The support of the trailer by the two central axle assemblies may also provide a tight or smaller turning radius or pivotal movement of the trailer relative to the ground. For example, the actuator or actuators 76 (and/or actuator 82) may be substantially locked to lock or hold the hitch member 70 in a desired orientation, such as in a substantially straight ahead position, whereby the trailer may be backed up or reversed in a normal manner (if the hitch member were not lockable in a desired orientation, special training and skill may be needed to properly steer the trailer when traveling in reverse), and may provide a tight turning radius due to the ability of the trailer to substantially pivot about the central axle assemblies. Optionally, the tires of the central axle assemblies may have a tread or track (not shown) wrapped or reeved around the tires to provide enhanced traction in areas where such traction may be desired.

Therefore, the present invention provides a cargo trailer or vehicle, and, more particularly, a cargo handling adverse terrain trailer (CHATT) or the like. The cargo trailer has a deck that is pivotally and vertically and longitudinally adjustable to assist in loading the trailer and positioning the deck at a desired level for loading and/or unloading a vehicle, such as an aircraft or the like. The deck of the cargo trailer may be pivoted about a longitudinally extending axis and/or one or more laterally extending axes to position the deck at a desired level and height and orientation relative to the frame of the trailer. The pivotal adjustment of the deck about either axis may be accomplished irrespective of the initial orientation or position of the deck relative to the trailer, in order to enhance the overall adjustability of the trailer. The deck of the trailer may pivot and move toward and into contact with the ground to ease loading and unloading of the trailer.

The cargo trailer of the present invention may also provide for enhanced turning or steering of the front wheels of the trailer via a hitch mechanism that provides for pivotal movement of the hitch member and pivotal movement of the front axle assembly about different pivot axes. Side-to-side movement of the hitch member thus may exert a turning force on the front axle assembly to provide for a sharper turning radius of the trailer. Optionally, the trailer of the present invention may provide for steering of the rear wheels to further enhance the maneuverability of the trailer. Also, the axle assemblies may optionally be selectively vertically adjustable relative to the frame of the trailer to provide for enhanced performance of the trailer in various driving conditions and driving surfaces. Trailer control while backing up may be greatly enhanced by the ability to selectively lock the hitch member in a desired orientation relative to the axle assembly, while forward tracking of the trailer behind the vehicle is also greatly enhanced when the hitch member is unlocked and allowed to pivot about the vertical pivot axis.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A trailer for carrying cargo, said trailer comprising:
   a frame portion;
   at least two axles mounted to said frame portion, each of said axles having at least one wheel at opposite ends of said axle, said wheels and said axles supporting said frame portion above the ground;
   a deck, said deck being pivotally mounted to said frame portion via a first support and a second support, said first and second supports being independently operable to raise and lower respective portions of said deck relative to said frame portion, said deck being pivotable about a longitudinal deck axis relative to said frame portion and a lateral deck axis relative to said frame portion via said supports, said longitudinal deck axis extending generally longitudinally along said deck, said lateral deck axis extending generally laterally across said deck and generally normal to said longitudinal deck axis;
   said first support comprising an extendable and retractable boom that is pivotally mounted to said frame portion and pivotable about a first lateral axis at said frame portion, said deck being pivotally mounted to said boom and pivotable about said longitudinal and lateral deck axes relative to said boom;
   said second support comprising a pair of rear supports at a rear end of said frame portion, said pair of rear supports being pivotally mounted at said rear end of said frame portion and being pivotable about a second lateral axis at said frame portion, said second support including a pivot member at an upper end of each of said rear supports; and
   said deck being slidably mounted to said pair of pivot members and being slidable longitudinally relative to said pivot members, said pivot members being pivotally mounted to respective ones of said pair of supports and being pivotable relative to said pair of supports about respective longitudinal axes, said deck being slidable generally along said longitudinal deck axis relative to said pivot members when said boom is extended or retracted.

2. The trailer of claim 1, wherein said deck is movable along said longitudinal deck axis and pivotable about said lateral deck axis to engage an end portion of said deck with the ground.

3. The trailer of claim 1, wherein said deck is pivotable about said longitudinal deck axis irrespective of a degree of pivotal movement about said lateral deck axis.

4. The trailer of claim 3, wherein said deck is slidable generally along said longitudinal deck axis irrespective of a degree of pivotal movement about said longitudinal and lateral deck axes.

5. The trailer of claim 1, wherein said deck is pivotable relative to said boom about at least two.

6. The trailer of claim 1, wherein said first and second lateral axes are coaxial.

7. The trailer of claim 1, wherein said first and second intend axes are non-coaxial.

8. The trailer of claim 7, wherein said pair of rear supports are pivotally mounted to respective brackets and are pivotable about said second lateral axis at said brackets, said brackets being pivotally mounted to said frame portion and pivotable relative to said frame portion about said first lateral axis when said boom pivots about said first lateral axis.

9. The trailer of claim 8, wherein said pair of rear supports are attached to said deck at opposite sides of a centerline of said deck, said pair of rear supports being independently extendable and retractable to cause said deck to pivot about said longitudinal deck axis.

10. The trailer of claim 8, wherein said deck is slidable relative to said second support when said pair of rear supports are pivoted about said second lateral axis.

11. The trailer of claim 8, wherein said second support is pivotable about said second lateral axis at said frame portion in response to at least one actuator, said at least one actuator pivoting said second support about said second lateral axis to vertically adjust said portion of said deck relative to said frame portion.

12. The trailer of claim 1, wherein said at least two axles comprise front and rear steerable axles that are steerable to steer said trailer as it moves over the ground.

13. The trailer of claim 12, wherein said rear steerable axle is turned in a first direction when said front steerable axle is turned in a second direction, said first direction being generally opposite to said second direction.

14. The trailer of claim 13, wherein said front axle is mechanically connected to said rear axle, such that pivotal movement of said front axle in said second direction causes a corresponding pivotal movement of said rear axle in said first direction.

15. The trailer of claim 14, wherein said front axle is mechanically connected to said rear axle via an elongated member extending between said front and rear axles.

16. The trailer or claim 12, wherein said at least two axles further comprises at least one center axle, said at least one center axle being vertically adjustable relative to said frame portion between a lowered position, where said wheels of said at least one center axle assist in supporting said frame portion above the ground, and a raised position, where said wheels of said at least one center axle are above the ground and said frame portion is supported by said wheels of said front and rear axles.

17. The trailer of claim 16, wherein said front arid rear axles are vertically adjustable between a lowered position, where said wheels of said front and rear axles assist in supporting said frame portion above the ground, and a raised position, where said wheels of said front and rear axles are above the ground and said frame portion is supported by said wheels of said at least one center axle.

18. The trailer of claim 12 including a trailer hitch portion that is pivotable to steer said front axle, said hitch portion being pivotally attached to a front end of said frame portion and being pivotable about a first generally vertical pivot axis.

19. The trailer of claim 18, wherein said front axle is incorporated into a front axle assembly that is pivotable about a second generally vertical pivot axis to steer said trailer.

20. The trailer of claim 19, wherein said hitch portion extends forwardly from said first pivot axis and is movably connected to a forward portion of said front axle assembly.

21. The trailer of claim 20, wherein said first generally vertical pivot axis is positioned forwardly of said second generally vertical pivot axis.

22. The trailer of claim 1, wherein said deck comprises a conveyor operable to convey an article onto and off from said deck.

23. The trailer of claim 1, wherein said deck includes an adjustable platform portion at an end of said deck, said adjustable platform being pivotable about lateral axis extending laterally across said deck.

24. A trailer for carrying cargo, said trailer comprising:
a frame portion;
at least two axles mounted to said frame portion, each of said axles having at least one wheel at opposite ends of said axle, said wheels and said axles supporting said frame portion above the ground;
a deck, said deck being pivotally mounted to said frame portion by a boom member and at least one rear support, said boom member being pivotally connected at said frame portion and at a forward portion of said deck, said at least one rear support being pivotally mounted at a rear portion of said frame portion and is pivotally and slidably attached to said deck, said at least one rear support being pivotable relative to said frame portion about a first lateral pivot axis at said frame portion and said deck being pivotable relative to said at least one rear support about a longitudinal pivot axis of said deck; and
said boom member being pivotable about a second lateral axis extending generally laterally across said frame portion to vertically adjust said forward portion of said deck relative to said frame portion, said boom member pivoting about said second lateral axis via a first actuator attached to said frame portion and said boom member, said boom member being extendable and retractable to longitudinally adjust a position of said deck relative to said frame portion, said boom member being extendable and retractable via a second actuator positioned along at least a portion of said boom member, said deck sliding relative to said at least one rear support when said boom member extends or retracts to longitudinally adjust the position of said deck relative to said at least one rear support.

25. The trailer of claim 24, wherein said forward portion of said deck is pivotally attached to an end of said boom member via a multi-axis connection that facilitates pivotal movement of said forward portion of said deck about at least two axes.

26. The trailer of claim 25, wherein said boom member comprises a telescopic boom member having a first member pivotally attached to said frame portion and a second member pivotally attached to said deck, said second member being extendable relative to said first member by said second actuator to longitudinally adjust said deck relative to said frame portion.

27. The trailer of claim 26, wherein said deck is longitudinally movable and pivotable about said laterally extending axis to move an end of said deck toward and into contact with the ground.

28. The trailer of claim 24, wherein said at least one rear support is pivotally mounted at at least one mounting bracket at a rear portion of said frame portion and is pivotable relative to said at least one mounting bracket about said first lateral axis to adjust said rear portion of said deck relative to said frame portion.

29. The trailer of claim 28, wherein said at least one mounting bracket is fixedly attached relative to said boom member, said at least one mounting bracket and said at least one rear support being pivotable about said second lateral axis as said boom member is pivoted about said second lateral axis.

30. The trailer of claim 28, wherein said at least one support is extendable and retractable to vertically adjust said rear portion of said deck relative to said frame portion.

31. The trailer of claim 30, wherein said at least one rear support comprises a pair of rear supports positioned towards opposite sides of said frame portion and said deck, said pair of rear supports being independently extendable and retractable to cause said deck to pivot about a longitudinal axis extending generally longitudinally along said deck.

32. A trailer for carrying cargo, said trailer comprising:
a frame portion;
at least two axles mounted to said frame portion, each of said axles having at least one wheel at opposite ends of said axle, said wheels and said axles supporting said frame portion above the ground; and
a deck, said deck being pivotally mounted to said frame portion and being pivotable about a longitudinal axis relative to said frame portion and a lateral axis relative to said frame portion, said longitudinal axis extending generally longitudinally along said deck, said lateral axis extending generally laterally across said deck and generally normal to said longitudinal axis;
an extendable and retractable boom pivotally mounted to said frame portion and pivotable about a first lateral axis at said frame portion, said deck being pivotally mounted to a forward end or said boom and being pivotable relative to said boom about at least two pivot axes, said boom being extended and retracted to longitudinally move said deck relative to said frame portion, said boom being pivoted about said first lateral axis to generally vertically move a forward portion of said deck; and
a pair of rearward supports, said rearward supports being pivotally mounted at a rearward portion of said frame portion at respective and opposite sides of a centerline of said frame portion, said rearward supports being pivotable relative to said frame portion about a second lateral axis at said frame portion, said rearward supports each including a slide member pivotally mounted at an upper end of said rearward supports, said deck being slidably mounted to said slide members, said rearward supports pivoting about said second lateral axis to vertically adjust said rearward portion of said deck relative to said frame portion, said rearward supports being independently extendable and retractable to pivot said deck about said longitudinal axis, said deck sliding along said slide members to longitudinally move relative to said rear supports in response to extension and retraction of said boom and in response to pivotal movement of said rearward supports about said second lateral axis.

33. The trailer of claim 32, wherein said slide members slide along said deck as said rearward supports are pivoted about said laterally extending axis at said frame portion.

34. The trailer of claim 32, wherein said first and second lateral axes are non-coaxial.

35. The trailer of claim 34, wherein said pair of rear supports are pivotally mounted to respective brackets and are pivotable about said second lateral axis at said brackets, said brackets being pivotally mounted to said frame portion and pivotable relative to said frame portion about said first lateral axis when said boom pivots about said first lateral axis.

36. The trailer of claim 32, wherein said rearward supports are fixed relative to said boom member and pivotable about said first lateral axis with said boom member.

37. The trailer of claim 36, wherein said rearward supports are pivotable about said second lateral axis to move said deck rearward and to lower said rearward portion of said deck toward and into contact with the ground.

38. The trailer of claim 32, wherein each of said pair of rearward supports comprises a telescopic support having a first member that is extendable and retractable relative to a second member, said first members being extendable and retractable via a pair of first actuators positioned at least partially along said rearward supports.

39. The trailer of claim 38, wherein said pair of rearward supports are pivoted about said second lateral axis via second actuators.

40. The trailer of claim 32, wherein said rearward supports are pivotable about said second lateral axis at said frame to move said rearward portion of said deck rearward relative to said frame portion and to lower said rearward portion of said deck downward toward the ground rearward of said frame portion.

41. The trailer of claim 32, wherein said rearward supports are pivotable in unison with one another.

* * * * *

UNITED STATES PATENT AND TRADEMARK OFFICE
CERTIFICATE OF CORRECTION

PATENT NO. : 7,134,829 B2  
APPLICATION NO. : 10/796619  
DATED : November 14, 2006  
INVENTOR(S) : Philip J. Quenzi and Richard W. Jenney It is certified that error appears in the above-identified patent and that said Letters Patent is hereby corrected as shown below:

Column 15:
Line 39, Claim 1, "lonaitudinal" should be --longitudinal--.
Line 55, Claim 5, Insert --axes-- after "two".
Line 59, Claim 7, "intend" should be --lateral--.

Column 16:
Line 30, Claim 16, "or" should be --of--.
Line 39, Claim 17, "arid" should be --and--.

Column 17:
Line 63, Claim 30, Insert --rear-- before "support".

Column 18:
Line 20, Claim 32, "or" should be --of--.

Signed and Sealed this

Twenty-ninth Day of April, 2008

JON W. DUDAS  
*Director of the United States Patent and Trademark Office*